US012737927B2

(12) United States Patent
Goodwin et al.

(10) Patent No.: US 12,737,927 B2
(45) Date of Patent: Sep. 15, 2026

(54) IMAGE AUGMENTATION TECHNIQUES FOR AUTOMATED VISUAL INSPECTION

(71) Applicant: AMGEN INC., Thousand Oaks, CA (US)

(72) Inventors: Al Patrick Goodwin, Dunleer (IE); Joseph Peter Bernacki, Thousand Oaks, CA (US); Graham F. Milne, Ventura, CA (US); Thomas Clark Pearson, Newbury Park, CA (US); Aman Mahendra Jain, Newbury Park, CA (US); Jordan Ray Fine, Ventura, CA (US); Kenneth E. Hampshire, Thousand Oaks, CA (US); Aik Jun Tan, Boston, MA (US); Osvaldo Perez Varela, Guaynabo, PR (US); Nishant Mukesh Gadhvi, Camarillo, CA (US)

(73) Assignee: AMGEN INC., Thousand Oaks, CA (US)

( * ) Notice: Subject to any disclaimer, the term of this patent is extended or adjusted under 35 U.S.C. 154(b) by 367 days.

(21) Appl. No.: 18/039,898

(22) PCT Filed: Dec. 1, 2021

(86) PCT No.: PCT/US2021/061309

§ 371 (c)(1),
(2) Date: Jun. 1, 2023

(87) PCT Pub. No.: WO2022/119870

PCT Pub. Date: Jun. 9, 2022

(65) Prior Publication Data

US 2024/0095983 A1 Mar. 21, 2024

Related U.S. Application Data

(60) Provisional application No. 63/120,508, filed on Dec. 2, 2020.

(51) Int. Cl.
*G06T 11/60* (2026.01)
*G01N 21/90* (2006.01)
(Continued)

(52) U.S. Cl.
CPC .............. *G06T 11/60* (2013.01); *G01N 21/90* (2013.01); *G06T 3/60* (2013.01); *G06T 5/40* (2013.01); *G06V 10/44* (2022.01)

(58) Field of Classification Search
None
See application file for complete search history.

(56) References Cited

U.S. PATENT DOCUMENTS 11,468,551 B1 10/2022 Amouie et al.
2017/0200092 A1 7/2017 Kisilev
(Continued)

FOREIGN PATENT DOCUMENTS

EP 3509696 A1 7/2019
JP 2019-118670 A 7/2019
(Continued)

OTHER PUBLICATIONS

Khanh-Duy et al., "YADA: You Always Dream Again for Better Object Detection", Multimedia Tools and Applications, vol. 78, No. 19, Jul. 8, 2019, pp. 28189-28208.
(Continued)

*Primary Examiner* — James A Thompson
(74) *Attorney, Agent, or Firm* — MARSHALL, GERSTEIN & BORUN LLP

(57) ABSTRACT

Various techniques facilitate the development of an image library that can be used to train and/or validate an automated visual inspection (AVI) model, such an AVI neural network for image classification. In one aspect, an arithmetic transposition algorithm is used to generate synthetic images from original images by transposing features (e.g., defects) onto
(Continued)

100 the original images, with pixel-level realism. In other aspects, digital inpainting techniques are used to generate realistic synthetic images from original images. Deep learning-based inpainting techniques may be used to add, remove, and/or modify defects or other depicted features. In still other aspects, quality control techniques are used to assess the suitability of image libraries for training and/or validation of AVI models, and/or to assess whether individual images are suitable for inclusion in such libraries.

24 Claims, 34 Drawing Sheets

(51) Int. Cl.

| | |
|---|---|
| ***G06T 3/60*** | (2024.01) |
| ***G06T 5/40*** | (2006.01) |
| ***G06V 10/44*** | (2022.01) |

(56) References Cited

U.S. PATENT DOCUMENTS

| | | | |
|---|---|---|---|
| 2019/0251397 A1 | 8/2019 | Tremblay et al. | |
| 2020/0089998 A1 | 3/2020 | Zagaynov et al. | |
| 2020/0126210 A1* | 4/2020 | Li | G06F 16/532 |
| 2020/0320345 A1 | 10/2020 | Nikolenko et al. | |
| 2021/0209464 A1* | 7/2021 | Bala | G06T 11/10 |

FOREIGN PATENT DOCUMENTS

| | | | | |
|---|---|---|---|---|
| RU | 2267232 C1 * | 12/2005 | H04N 1/40 |
| RU | 2580456 C1 | 4/2016 | |
| TW | 201502860 A | 1/2015 | |
| WO | WO-2014126966 A1 | 8/2014 | |
| WO | WO-2021/096827 A1 | 5/2021 | |

OTHER PUBLICATIONS

Quan et al., "Deep Learning-Based Automatic Detection of Defective Tablets in Pharmaceutical Manufacturing", IFMBE Proceedings, 8th International Conference on the Development of Biomedical Engineering in Vietnam, Proceedings of BME 8, vol. 85, Jul. 20, 2020, pp. 789-801.

Debidatta et al., "Cut, Paste and Learn: Surprisingly Easy Snythesis for Instance Detection", 2017 IEEE International Conference on Computer Vision, Oct. 22, 2017, pp. 1310-1319.

Search Report and Written Opinion in International Application No. PCT/US2021/061309 dated May 13, 2022, 17 pages.

Eurasian Patent Application No. 202391645, Office Action, mailed Sep. 29, 2023.

Eurasian Patent Application No. 202491872, Search Report, dated Nov. 21, 2024.

Japanese Patent Application No. 2023-532732, Notice of Reasons for Refusal, dated May 27, 2025.

Kaur et al., Inpainting of irregular holes in a manuscript using UNet and partial convolution, 2020 Second International Conference on Inventive Research in Computing Applications (ICIRCA), Sep. 1, 2020.

Hassan et al., Visual inspection of products with geometrical quality characteristics of known tolerances, Ain Shams Engineering Journal, 1:79-84 (Sep. 2010).

* cited by examiner

800

900

902

904

906

908

910

1000

1002

1004

1406

1500

1600

1602

2004

2800

IMAGE AUGMENTATION TECHNIQUES FOR AUTOMATED VISUAL INSPECTION

FIELD OF DISCLOSURE

The present application relates generally to automated visual inspection systems for pharmaceutical or other applications, and more specifically to techniques that augment image libraries for use in developing, training, and/or validating such systems.

BACKGROUND

In various contexts, quality control procedures require the careful examination of samples for defects, with any samples exhibiting defects being rejected, discarded, and/or further analyzed. In a pharmaceutical manufacturing context, for example, containers (e.g., syringes or vials) and/or their contents (e.g., fluid or lyophilized drug products) must be rigorously inspected for defects prior to sale or distribution. Numerous other industries likewise rely on visual inspection in order to ensure product quality, or for other purposes. Increasingly, the defect inspection task has become automated (i.e., "automated visual inspection" or "AVI") in order to remove human error, lower costs, and/or reduce inspection times (e.g., to handle large quantities of drugs or other items in commercial production). For example, "computer vision" or "machine vision" software has been used in pharmaceutical contexts.

Recently, deep learning techniques have emerged as a promising tool for AVI. Generally, however, these techniques require far more images than traditional AVI systems to develop, train, and fully test the models (e.g., neural networks). Moreover, robust model performance generally depends on a carefully designed image set. For example, the image set should exhibit sufficiently diverse conditions (e.g., by showing defects in different locations, and having a range of different shapes and sized, etc.). Further, even a large and diverse training image library can result in poor AVI performance if the image set causes the deep learning model to make decisions for the wrong reasons (e.g., based on irrelevant image features). This can be particularly problematic in contexts or scenarios where depicted defects are small or bland relative to other (non-defect) image features.

For both deep learning and more traditional (e.g., machine vision) AVI systems, development and qualification processes that use sample image libraries should ensure that false negatives or "false accepts" (i.e., a defect is missed), as well as false positives or "false rejects" (i.e., a defect is incorrectly identified), are within tolerable thresholds. For example, zero or near-zero false negatives may be required in certain contexts (e.g., pharmaceutical contexts where patient safety is a concern). While false positives can be less critical, they can be very costly in economic terms, and can be more difficult to address than false negatives when developing an AVI system. These and other factors can make the development of an image library a highly iterative process that is very complex, labor-intensive, and costly. Further still, any product line changes (e.g., new drugs, new containers, new fill levels for drugs within the containers, etc.), or changes to the inspection process itself (e.g., different types of camera lenses, changes in camera positioning or illumination, etc.), can require not only retraining and/or requalifying the model, but also (in some cases) a partial or total rebuild of the image library.

SUMMARY

Embodiments described herein relate to automated image augmentation techniques that assist in generating and/or assessing image libraries for developing, training, and/or validating robust deep learning models for AVI. In particular, various image augmentation techniques disclosed herein apply digital transformations to "original" images in order to artificially expand the scope of training libraries (e.g., for deep learning AVI applications, or for more traditional computer/machine vision AVI applications). Unlike comparatively simple image transformations that have previously been used for expand image libraries (e.g., reflection, linear scaling, and rotation), the techniques described herein can facilitate the generation of libraries that are not only larger and more diverse, but also more balanced and "causal," i.e., more likely to make classifications/decisions for the right reason rather than keying on irrelevant image features, and therefore more likely to provide good performance across a wide range of samples. To ensure causality, implementations described herein are used to generate large quantities of "population-representative" synthetic images (i.e., synthetic images that are sufficiently representative of the images to be inferenced by the model in run-time operation).

In one aspect of the present disclosure, a novel arithmetic transposition algorithm is used to generate synthetic images from original images by transposing features onto the original images, with pixel-level realism. The arithmetic transposition algorithm may be used to generate synthetic "defect" images (i.e., images that depict defects) by augmenting "good" images (i.e., images that do not depict those defects) using images of the defects themselves. As one example, the algorithm may generate synthetic images of syringes with cracks, malformed plungers, and/or other defects using images of defect-free syringes as well as images of the syringe defects. As another example, the algorithm may generate synthetic images of automotive body components with chips, scratches, dents, and/or other defects using images of defect-free body components as well as images of the defects. Numerous other applications are also possible, in quality control or other contexts.

In other aspects of the present disclosure, digital "inpainting" techniques are used to generate realistic synthetic images from original images, to complement an image library for training and/or validation of an AVI model (e.g., a deep learning-based AVI model). In one such aspect, a defect depicted in an original image can be removed by masking the defect in the original image, calculating correspondence metrics between (1) portions or the original image that are adjacent to the masked area, and (2) other portions of the original image outside the masked area, and filling in the masked portion with an artificial, defect-free portion based on the calculated metrics. The ability to remove defects from images can have a subtle yet profound influence on a training image library. In particular, complementary "good" and "defect" images can be used in tandem to minimize the impact of contextual biases when training an AVI model.

Other digital inpainting techniques of this disclosure leverage deep learning, such as deep learning based on partial convolution. Variations of these deep learning-based inpainting techniques can be used to remove a defect from an original image, to add a defect to an original image, and/or to modify (e.g., move or change the appearance of) a feature in an original image. For example, variations of these techniques may be used to remove a crack, chip, fiber, malformed plunger, or other defect from an image of a syringe containing a drug product, to add such a defect to a syringe image that did not originally depict the defect, or to move or otherwise modify a meniscus or plunger depicted in the original syringe image. These deep learning-based inpainting techniques facilitate the careful design of a training image library, and can provide a good solution even for high-mix, low-volume applications where it has traditionally been difficult to develop training image libraries in a cost-effective manner.

Generally, image augmentation techniques disclosed herein can improve AVI performance with respect to both "false accepts" and "false rejects." The image augmentation techniques that add variability to depicted attributes/features (e.g., meniscus level, air gap size, bubbles, small irregularities in glass container walls, etc.) can be particularly useful for reducing false rejects.

In still other aspects of the present disclosure, quality control techniques are used to assess the suitability of image libraries for training and/or validation of AVI deep learning models, and/or to assess whether individual images are suitable for inclusion in such libraries. These may include both "pre-processing" quality control techniques that assess image variability across a dataset, and "post-processing" quality control techniques that assess the degree of similarity between a synthetic/augmented image and a set of images (e.g., real images that have not been altered by adding, removing, or modifying depicted features).

BRIEF DESCRIPTION OF THE DRAWINGS

The skilled artisan will understand that the figures described herein are included for purposes of illustration and do not limit the present disclosure. The drawings are not necessarily to scale, and emphasis is instead placed upon illustrating the principles of the present disclosure. It is to be understood that, in some instances, various aspects of the described implementations may be shown exaggerated or enlarged to facilitate an understanding of the described implementations.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

As the terms are used herein, "synthetic image" and "augmented image" (used interchangeably) generally refers to an image that has been digitally altered to depict something different than what the image originally depicted, and is to be distinguished from the output produced by other types of image processing (e.g., adjusting contrast, changing resolution, cropping, filtering, etc.) that do not change the nature of the thing depicted. Conversely, a "real image," as referred to herein, refers to an image that is not a synthetic/augmented image, regardless of whether other type(s) of image processing have previously been applied to the image. An "original image," as referred to herein, is an image that is digitally modified to generate a synthetic/augmented image, and may be a real image or a synthetic image (e.g., an image that was previously augmented, prior to an additional round of augmentation). References herein to depicted "features" (e.g., depicted "defects") are references to characteristics of the thing imaged (e.g., a crack or meniscus of a syringe as shown in an image of the syringe, or a scratch or dent on an automobile body component as shown in an image of the component, etc.), and are to be distinguished from features of the image itself that are unrelated to the nature of the thing imaged (e.g., missing or damaged portions of an image, such as faded or defaced portions of an image, etc.).

Figure 1:
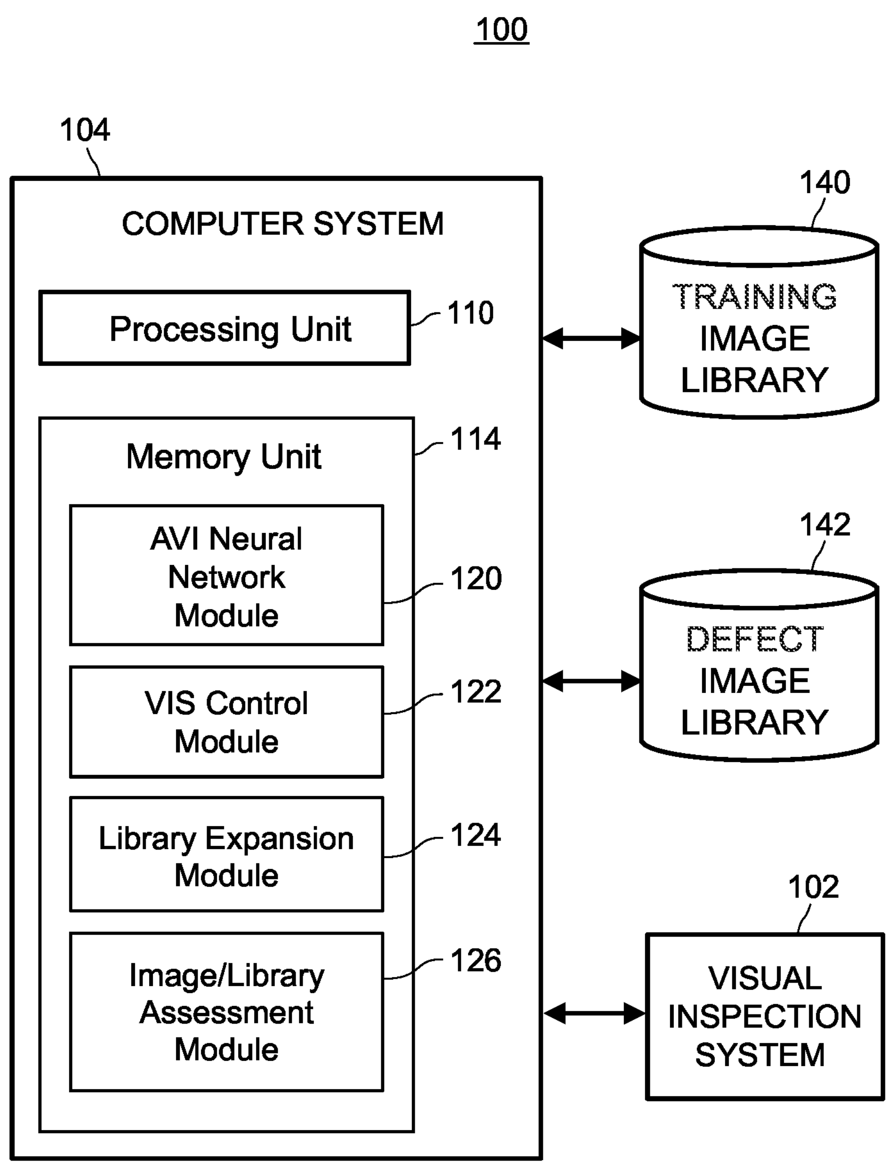
FIG. 1 is a simplified block diagram of an example system that can implement various techniques described herein relating to the development and/or assessment of an automated visual inspection (AVI) image library.

FIG. 1 is a simplified block diagram of an example system 100 that can implement various techniques described herein relating to the development and/or assessment of an automated visual inspection (AVI) training and/or validation image library. For example, the image library may be used to train one or more neural networks to perform AVI tasks. Once trained and qualified, the AVI neural network(s) may be used for quality control at the time of manufacture (and/or in other contexts) to detect defects. In a pharmaceutical context, for example, the AVI neural network(s) may be used to detect defects associated with syringes, vials, cartridges, or other container types (e.g., cracks, scratches, stains, missing components, etc., of the containers), and/or to detect defects associated with fluid or lyophilized drug products within the containers (e.g., the presence of fibers and/or other foreign particles). As another example, in an automotive context, the AVI neural network(s) may be used to detect defects in the bodywork of automobiles or other vehicles (e.g., cracks, scratches, dents, stains, etc.), during production and/or at other times (e.g., to help determine a fair resale value, to check the condition of a returned rental vehicle, etc.). Numerous other uses are also possible. Because the disclosed techniques can substantially lower the cost and time associated with building an image library, AVI neural networks may be used to detect visible defects in virtually any quality control application (e.g., checking the condition of appliances, home siding, textiles, glassware, etc., prior to sale). It is understood that, while the examples provided herein relate primarily to the pharmaceutical context, the techniques described herein need not be limited to such applications. Moreover, in some implementations, the synthetic images are used for a purpose other than training an AVI neural network. For example, the images may instead be used to qualify a system that uses computer vision without deep learning.

System 100 includes a visual inspection system 102 that is configured to produce training and/or validation images. Specifically, visual inspection system 102 includes hardware (e.g., a conveyance mechanism, light source(s), camera(s), etc.), as well as firmware and/or software, that is configured to capture digital images of a sample (e.g., a container holding a fluid or lyophilized substance). One example of visual inspection system 102 is described below with reference to FIG. 2, although any suitable visual inspection system may be used. In some embodiments, the visual inspection system 102 is an offline (e.g., lab-based) "mimic station" that closely replicates important aspects of a commercial line equipment station (e.g., optics, lighting, etc.), thereby allowing development of the training and/or validation library without causing excessive downtime of the commercial line equipment. The development, arrangement, and use of example mimic stations are shown and discussed in PCT Patent Application No. PCT/US20/59776 (entitled "Offline Troubleshooting and Development for Automated Visual Inspection Stations" and filed on Nov. 10, 2020), the entirety of which is hereby incorporated herein by reference. In other embodiments, visual inspection system 102 is commercial line equipment that is also used during production.

Visual inspection system 102 may image each of a number of samples (e.g., containers) sequentially. To this end, visual inspection system 102 may include, or operate in conjunction with, a Cartesian robot, conveyor belt, carousel, starwheel, and/or other conveying means that successively move each sample into an appropriate position for imaging, and then move the sample away once imaging of the sample is complete. While not shown in FIG. 1, visual inspection system 102 may include a communication interface and processors to enable communication with computer system 104.

Computer system 104 may generally be configured to control/automate the operation of visual inspection system 102, and to receive and process images captured/generated by visual inspection system 102, as discussed further below. Computer system 104 may be a general-purpose computer that is specifically programmed to perform the operations discussed herein, or a special-purpose computing device. As seen in FIG. 1, computer system 104 includes a processing unit 110 and a memory unit 114. In some embodiments, however, computer system 104 includes two or more computers that are either co-located or remote from each other. In these distributed embodiments, the operations described herein relating to processing unit 110 and memory unit 114, or relating to any of the modules implemented when processing unit 110 executes instructions stored in memory unit 114, may be divided among multiple processing units and/or multiple memory units.

Processing unit 110 includes one or more processors, each of which may be a programmable microprocessor that executes software instructions stored in memory unit 114 to execute some or all of the functions of computer system 104 as described herein. Processing unit 110 may include one or more graphics processing units (GPUs) and/or one or more central processing units (CPUs), for example. Alternatively, or in addition, one or more processors in processing unit 110 may be other types of processors (e.g., application-specific integrated circuits (ASICs), field-programmable gate arrays (FPGAs), etc.), and some of the functionality of computer system 104 as described herein may instead be implemented in hardware.

Memory unit 114 may include one or more volatile and/or non-volatile memories. Any suitable memory type or types may be included in memory unit 114, such as read-only memory (ROM) and/or random access memory (RAM), flash memory, a solid-state drive (SSD), a hard disk drive (HDD), and so on. Collectively, memory unit 114 may store one or more software applications, the data received/used by those applications, and the data output/generated by those applications.

In particular, memory unit 114 stores the software instructions of various modules that, when executed by processing unit 110, perform various functions for the purpose of training, validating, and/or qualifying one or more AVI neural networks, and/or other types of AVI software (e.g., computer vision software). Specifically, in the example embodiment of FIG. 1, memory unit 114 includes an AVI neural network module 120, a visual inspection system (VIS) control module 122, a library expansion module 124, and an image/library assessment module 126. In other embodiments, memory unit 114 may omit one or more of modules 120, 122, 124 and 126, and/or include one or more additional modules. As noted above, computer system 104 may be a distributed system, in which case one, some, or all of modules 120, 122, 124 and 126 may be implemented in whole or in part by a different computing device or system (e.g., by a remote server coupled to computer system 104 via one or more wired and/or wireless communication networks). Moreover, the functionality of any one of modules 120, 122, 124 and 126 may be divided among different software applications. As just one example, in an embodiment where computer system 104 accesses a web service to train and use one or more AVI neural networks, some or all of the software instructions of AVI neural network module 120 may be stored and executed at a remote server.

AVI neural network module 120 comprises software that uses images stored in a training image library 140 to train one or more AVI neural networks. Training image library 140 may be stored in memory unit 114, and/or in another local or remote memory (e.g., a memory coupled to a remote library server, etc.). In some embodiments, in addition to training, AVI neural network module 120 may implement/run the trained AVI neural network(s), e.g., by applying images newly acquired by visual inspection system 102 (or another visual inspection system) to the neural network(s) for validation, qualification, or possibly even run-time operation. In various embodiments, the AVI neural network(s) trained by AVI neural network module 120 classify entire images (e.g., defect vs. no defect, or presence or absence of a particular type of defect, etc.), classify images on a per-pixel basis (i.e., image segmentation), detect objects in images (e.g., detect the presence and position of particular defect types such as scratches, cracks, foreign objects, etc.), or some combination thereof (e.g., one neural network classifying images, and another performing object detection). In some implementations, AVI neural network module 120 generates (for reasons discussed below) heatmaps associated with operation of the trained AVI neural network(s). To this end, AVI neural network module 120 may include deep learning software such as MVTec from HALCON®, Vidi® from Cognex®, Rekognition® from Amazon®, TensorFlow, PyTorch, and/or any other suitable off-the-shelf or customized deep learning software. The software of AVI neural network module 120 may be built on top of one or more pre-trained networks, such as ResNet50 or VGGNet, for example, and/or one or more custom networks.

In some embodiments, VIS control module 122 controls/automates operation of visual inspection system 102 such that sample images (e.g., container images) can be generated with little or no human interaction. VIS control module 122 may cause a given camera to capture a sample image by sending a command or other electronic signal (e.g., generating a pulse on a control line, etc.) to that camera. Visual inspection system 102 may send the captured container images to computer system 104, which may store the images in memory unit 114 for local processing. In alternative embodiments, visual inspection system 102 may be locally controlled, in which case VIS control module 122 may have less functionality than is described herein (e.g., only handling the retrieval of images from visual inspection system 102), or may be omitted entirely from memory unit 114.

Library expansion module 124 (also referred to herein as simply "module 124") processes sample images generated by visual inspection system 102 (and/or other visual inspection systems) to generate additional, synthetic/augmented images for inclusion in training image library 140. Module 124 may implement one or more image augmentation techniques, including any one or more of the image augmentation techniques disclosed herein. As discussed below, some of those image augmentation techniques may make use of a feature image library 142 to generate synthetic images. Feature image library 142 may be stored in memory unit 114, and/or in another local or remote memory (e.g., a memory coupled to a remote library server, etc.), and contains images of various types of defects (e.g., cracks, scratches, chips, stains, foreign objects, etc.), and/or images of variations of each defect type (e.g., cracks with different sizes and/or patterns, foreign objects having different shapes and sizes, etc.). Alternatively, or in addition, feature image library 142 may include images of various other types of features (e.g., different meniscuses), which may or may not exhibit defects. The images in feature image library 142 may be cropped portions of full sample images, for example, such that a substantial portion of each image includes the feature (e.g., defect).

Figure 3C:
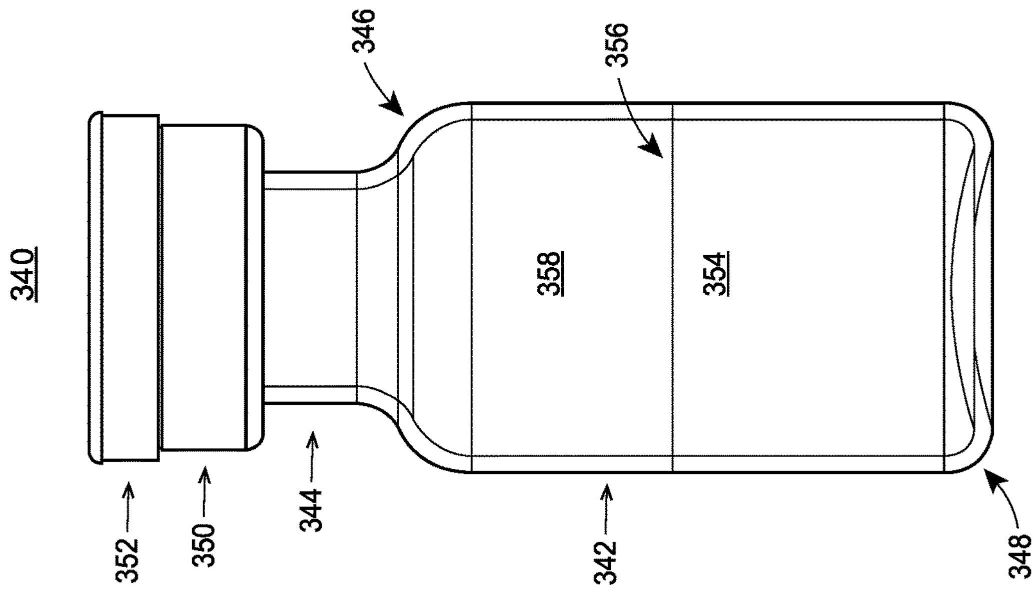
FIGS. 3A through 3C depict various example container types that may be inspected using a visual inspection system such as the visual inspection system of FIG. 2.
Figure 3B:
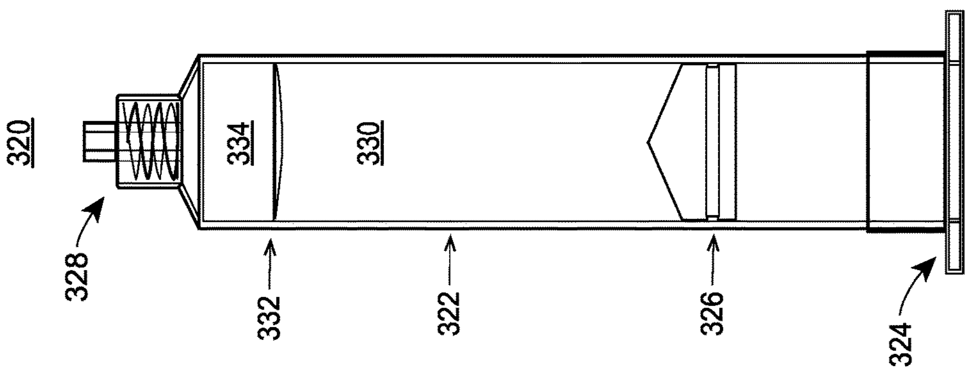
Figure 3A:
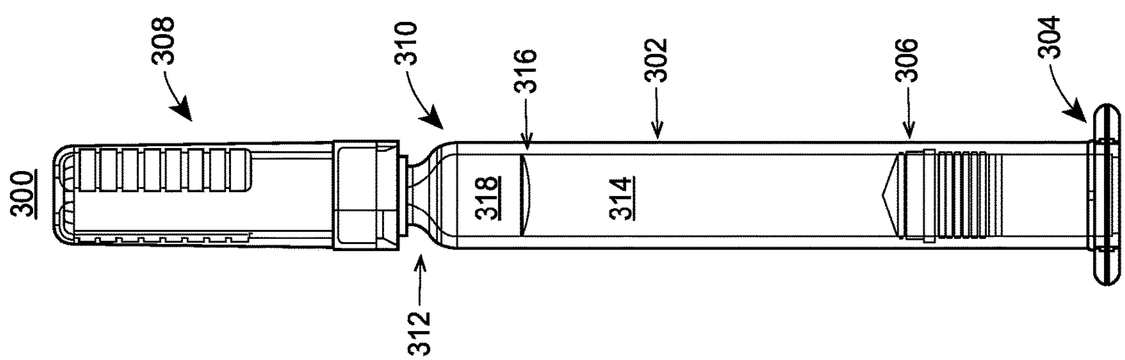

Generally, the feature image library 142 may include images of virtually any type(s) of feature associated with the samples being imaged. In a pharmaceutical context, for example, the feature image library 142 may include defects associated with containers (e.g., syringes, cartridges, vials, etc.), container contents (e.g., liquid or lyophilized drug products), and/or interactions between the containers and their contents (e.g., leaks, etc.). As non-limiting examples, the defect images may include images of syringe defects such as: a crack, chip, scratch, and/or scuff in the barrel, shoulder, neck, or flange; a broken or malformed flange; an airline in glass of the barrel, shoulder, or neck wall; a discontinuity in glass of the barrel, shoulder, or neck; a stain on the inside or outside (or within) the barrel, shoulder, or neck wall; adhered glass on the barrel, shoulder, or neck; a knot in the barrel, shoulder, or neck wall; a foreign particle embedded within glass of the barrel, shoulder, or neck wall; a foreign, misaligned, missing, or extra plunger; a stain on the plunger, malformed ribs of the plunger; an incomplete or detached coating on the plunger; a plunger in a disallowed position; a missing, bent, malformed, or damaged needle shield; a needle protruding from the needle shield; etc. Examples of defects associated with the interaction between syringes and the syringe contents may include a leak of liquid through the plunger, liquid in the ribs of the plunger, a leak of liquid from the needle shield, and so on. Various components of an example syringe are shown in FIG. 3A, discussed below.

Non-limiting examples of defects associated with cartridges may include: a crack, chip, scratch, and/or scuff in the barrel or flange; a broken or malformed flange; a discontinuity in the barrel; a stain on the inside or outside (or within) the barrel; materials adhered to the barrel; a knot in the barrel wall; a foreign, misaligned, missing, or extra piston; a stain on the piston; malformed ribs of the piston; a piston in a disallowed position; a flow mark in the barrel wall; a void in plastic of the flange, barrel, or luer lock; an incomplete mold of the cartridge; a missing, cut, misaligned, loose, or damaged cap on the luer lock; etc. Examples of defects associated with the interaction between cartridges and the cartridge contents may include a leak of liquid through the piston, liquid in the ribs of the piston, and so on. Various components of an example cartridge are shown in FIG. 3B, discussed below.

Non-limiting examples of defects associated with vials may include: a crack, chip, scratch, and/or scuff in the body; an airline in glass of the body; a discontinuity in glass of the body; a stain on the inside or outside (or within) the body; adhered glass on the body; a knot in the body wall; a flow mark in the body wall; a missing, misaligned, loose, protruding or damaged crimp; a missing, misaligned, loose, or damaged flip cap; etc. Examples of defects associated with the interaction between vial and the vial contents may include a leak of liquid through the crimp or the cap, and so on. Various components of an example vial are shown in FIG. 3C, discussed below.

Non-limiting examples of defects associated with container contents (e.g., contents of syringes, cartridges, vials, or other container types) may include: a foreign particle suspended within liquid contents; a foreign particle resting on the plunger dome, piston dome, or vial floor; a discolored liquid or cake; a cracked, dispersed, or otherwise atypically distributed/formed cake; a turbid liquid; a high or low fill level; etc. "Foreign" particles may be, for example, fibers, bits of rubber, metal, stone, or plastic, hair, and so on. In some embodiments, bubbles are considered to be innocuous and are not considered to be defects.

Non-limiting examples of other types of features that may be depicted in images of feature image library 142 may include: meniscuses of different shapes and/or at different positions; plungers of different types and/or at different positions; bubbles of different sizes and/or shapes, and/or at different locations within a container; different air gap sizes in a container; different sizes, shapes, and/or positions of irregularities in glass or another translucent material; etc.

In operation, the computer system 104 stores the sample images collected by visual inspection system 102 (possibly after cropping and/or other image pre-processing by computer system 104), as well as synthetic images generated by library expansion module 124, and possibly real and/or synthetic images from one or more other sources, in training image library 140. AVI neural network module 120 then uses at least some of the sample images in training image library 140 to train the AVI neural network(s), and uses other images in library 140 (or in another library not shown in FIG. 1) to validate the trained AVI neural network(s). As the terms are used herein, "training," "validating," or "qualifying" a neural network encompasses directly executing the software that runs the neural network, and also encompasses initiating the running of the neural network (e.g., by commanding or requesting a remote server to train the neural network or run the trained neural network). In some embodiments, for example, computer system 104 may "train" a neural network by accessing a remote server that includes AVI neural network module 120 (e.g., by accessing a web service supported by the remote server).

The operation of each of modules 120 through 126 is discussed in further detail below, with reference to elements of various other figures.

Figure 2:
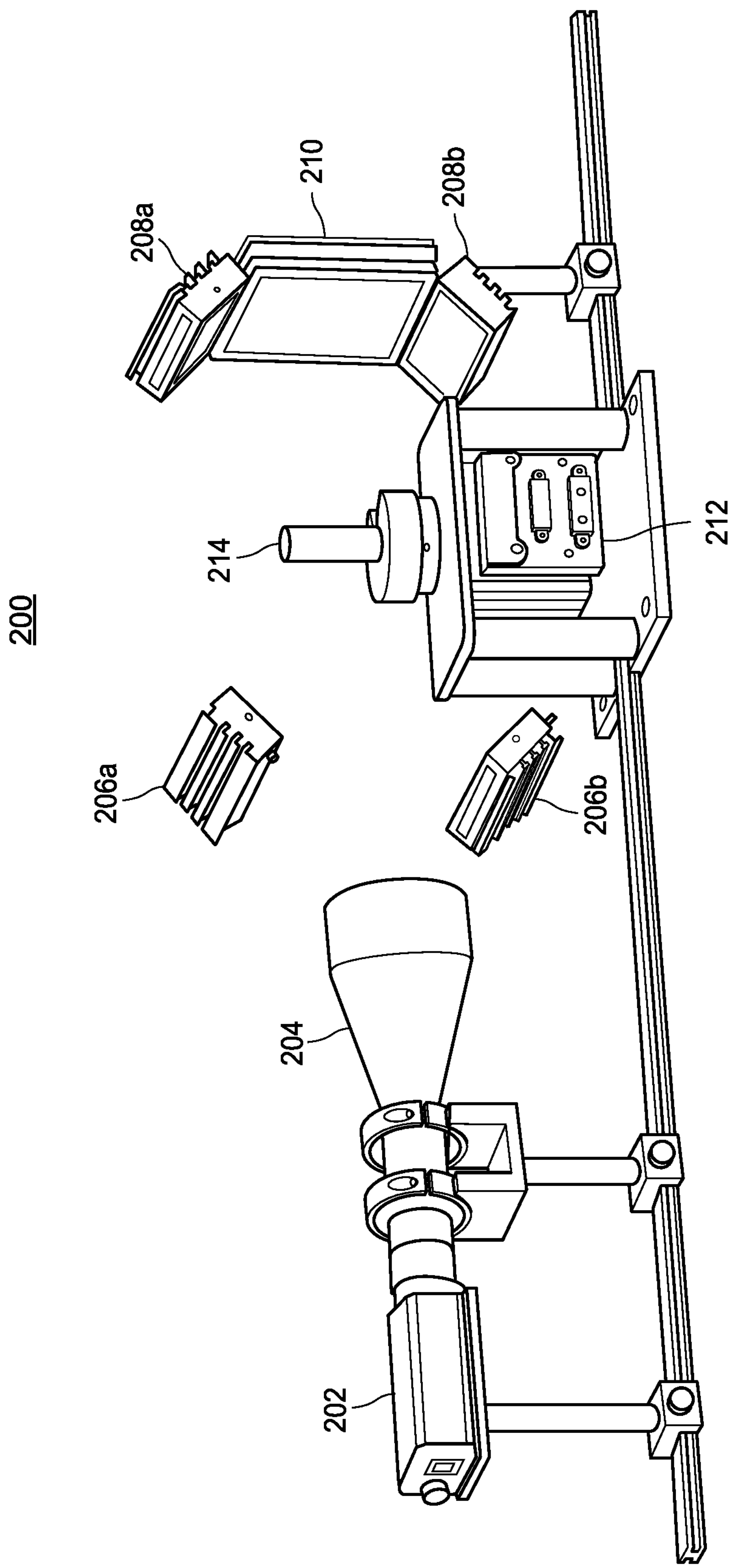
FIG. 2 depicts an example visual inspection system that may be used in a system such as the system of FIG. 1.

FIG. 2 depicts an example visual inspection system 200 that may be used as the visual inspection system 102 of FIG. 1, in a pharmaceutical application. Visual inspection system 200 includes a camera 202, a lens 204, forward-angled light sources 206a and 206b, rear-angled light sources 208a and 208b, a backlight source 210, and an agitation mechanism 212. Camera 202 captures one or more images of a container 214 (e.g., a syringe, vial, cartridge, or any other suitable type of container) while container 214 is held by agitation mechanism 212 and illuminated by light sources 206, 208, and/or 210 (e.g., with VIS control module 122 activating different light sources for different images, sequentially or simultaneously). The visual inspection system 200 may include additional or fewer light sources (e.g., by omitting backlight source 210). Container 214 may hold a liquid or lyophilized pharmaceutical product, for example.

Camera 202 may be a high-performance industrial camera or smart camera, and lens 204 may be a high-fidelity telecentric lens, for example. In one embodiment, camera 202 includes a charge-coupled device (CCD) sensor. For example, camera 202 may be a Basler® pilot piA2400-17 gm monochrome area scan CCD industrial camera, with a resolution of 2448×2050 pixels. As used herein, the term "camera" may refer to any suitable type of imaging device (e.g., a camera that captures the portion of the frequency spectrum visible to the human eye, or an infrared camera, etc.).

The different light sources 206, 208 and 210 may be used to collect images for detecting defects in different categories. For example, forward-angled light sources 206a and 206b may be used to detect reflective particles or other reflective defects, rear-angled light sources 208a and 208b may be used for particles generally, and backlight source 210 may be used to detect opaque particles, and/or to detect incorrect dimensions and/or other defects of containers (e.g., container 214). Light sources 206 and 208 may include CCS® LDL2-74X30RD bar LEDs, and backlight source 210 may be a CCS® TH-83X75RD backlight, for example.

Agitation mechanism 212 may include a chuck or other means for holding and rotating (e.g., spinning) containers such as container 214. For example, agitation mechanism 212 may include an Animatics® SM23165D SmartMotor, with a spring-loaded chuck securely mounting each container (e.g., syringe) to the motor.

While the visual inspection system 200 may be suitable for producing container images to train and/or validate one or more AVI neural networks, the ability to detect defects across a broad range of categories may require multiple perspectives. Thus, in some implementations, visual inspection system 102 of FIG. 1 may instead be a multi-camera system. In still other implementations, visual inspection system 102 of FIG. 1 may include a line-scan camera, and rotate the sample (e.g., container) to capture each image. Moreover, automated handling/conveyance of samples may be desirable in order to quickly obtain a much larger set of training images. Visual inspection system 102 may be, for example, any of the visual inspections shown and/or described in U.S. Provisional Patent Application No. 63/020,232 (entitled "Deep Learning Platforms for Automated Visual Inspection" and filed on May 5, 2020), the entirety of which is hereby incorporated herein by reference, or any other suitable visual inspection system for any type of product. In an automotive context, for example, visual inspection system 200 may include a conveyor belt with illumination sources and multiple cameras mounted above and/or around a particular conveyor belt station.

FIGS. 3A through 3C depict various example container types that, in certain pharmaceutical contexts, may be used as the samples imaged by visual inspection system 102 of FIG. 1 or visual inspection system 200 of FIG. 2. Referring first to FIG. 3A, an example syringe 300 includes a hollow barrel 302, a flange 304, a plunger 306 that provides a movable fluid seal within the interior of barrel 302, and a needle shield 308 to cover the syringe needle (not shown in FIG. 3A). Barrel 302 and flange 304 may be formed of glass and/or plastic, and plunger 306 may be formed of rubber and/or plastic, for example. The needle shield 308 is separated by a shoulder 310 of syringe 300 by a gap 312. Syringe 300 contains a liquid (e.g., drug product) 314 within barrel 302 and above plunger 306. The top of liquid 314 forms a meniscus 316, above which is an air gap 318.

Referring next to FIG. 3B, an example cartridge 320 includes a hollow barrel 322, a flange 324, a piston 326 that provides a movable fluid seal within the interior of barrel 322, and a luer lock 328. Barrel 322, flange 324, and/or luer lock 328 may be formed of glass and/or plastic and piston 326 may be formed of rubber and/or plastic, for example. Cartridge 320 contains a liquid (e.g., drug product) 330 within barrel 322 and above piston 326. The top of liquid 330 forms a meniscus 332, above which is an air gap 334.

Referring next to FIG. 3C, an example vial 340 includes a hollow body 342 and neck 344, with the transition between the two forming a shoulder 346. At the bottom of vial 340, body 342 transitions to a heel 348. A crimp 350 includes a stopper (not visible in FIG. 3C) that provides a fluid seal at the top of vial 340, and a flip cap 352 covers crimp 350. Body 342, neck 344, shoulder 346, and heel 348 may be formed of glass and/or plastic, crimp 350 may be formed of metal, and flip cap 352 may be formed of plastic, for example. Vial 340 may include a liquid (e.g., drug product) 354 within body 342. The top of liquid 354 may form a meniscus 356 (e.g., a very slightly curved meniscus, if body 342 has a relatively large diameter), above which is an air gap 358. In other embodiments, liquid 354 is instead a solid material within vial 340. For example, vial 340 may include a lyophilized (freeze dried) drug product 354, also referred to as "cake."

Figure 4A:
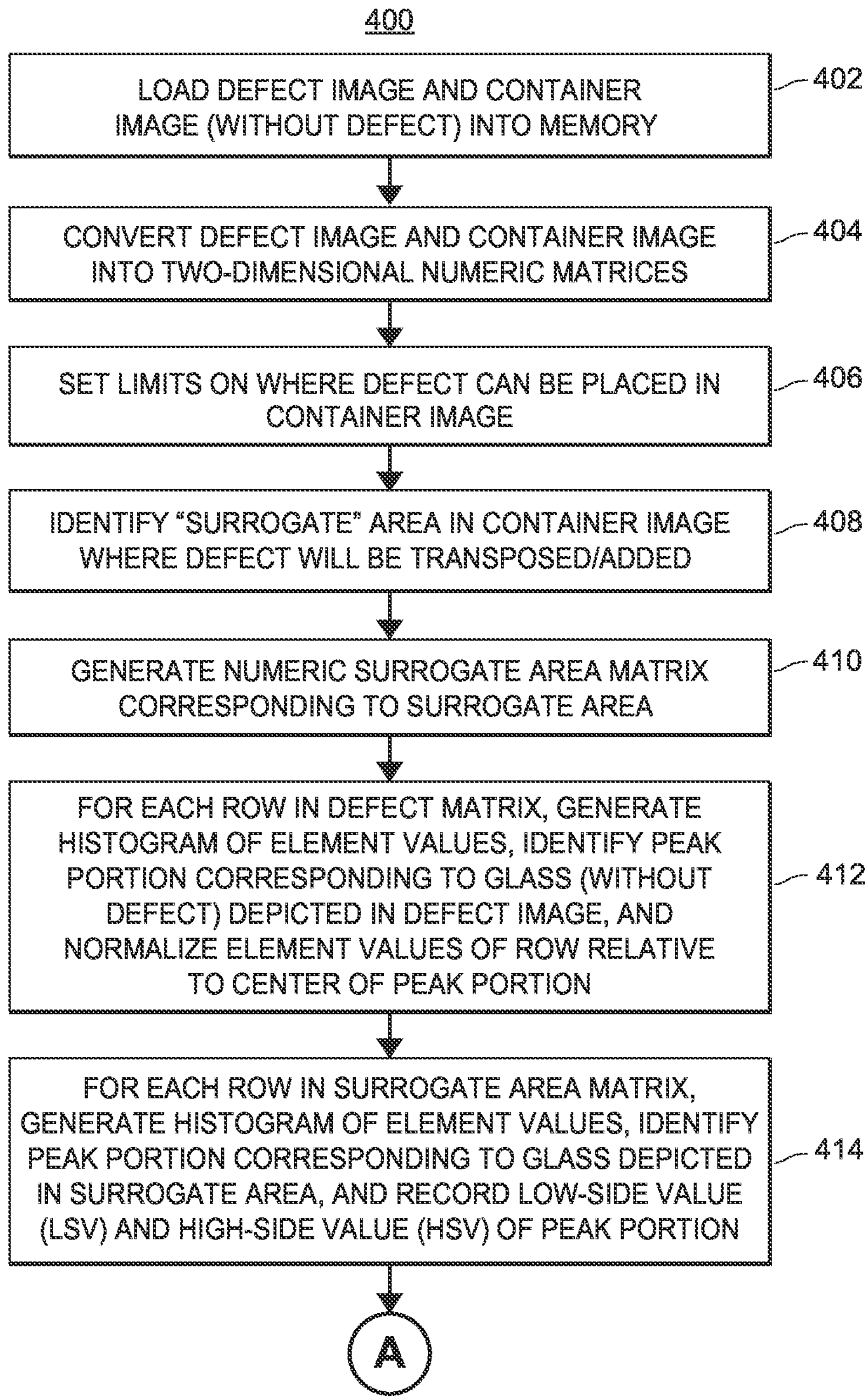
FIG. 4A depicts an arithmetic transposition algorithm that can be used to add features to images with pixel-level realism.
Figure 4A:
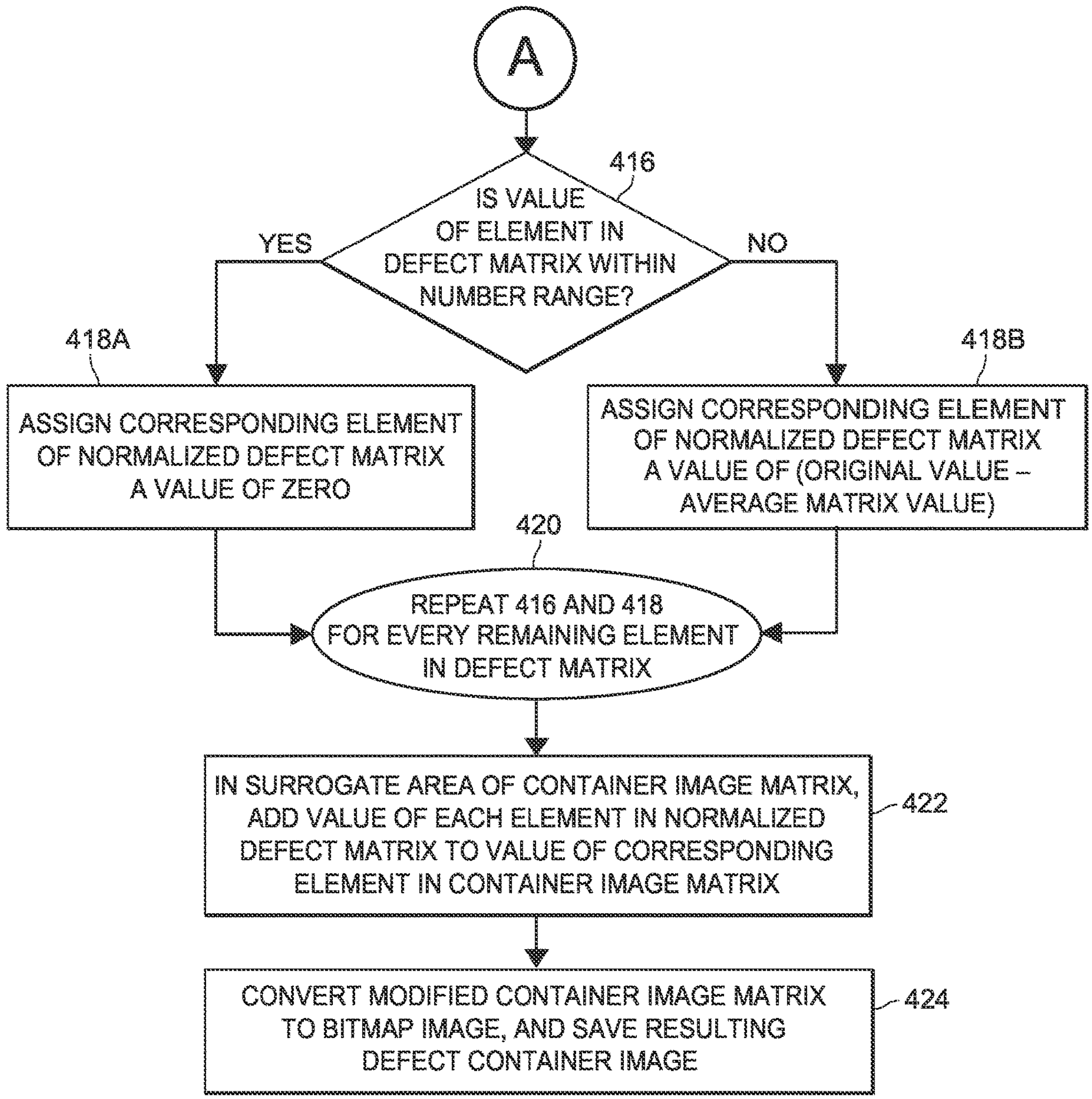

Various image augmentation techniques that may be implemented by library expansion module 124 (as executed by processing unit 110), for example, will now be described. Referring first to FIG. 4A, module 124 may implement an arithmetic transposition algorithm 400 to add features (e.g., defects) to original (e.g., real) images, with pixel-level realism. While FIG. 4A describes the algorithm 400 with reference to "container" images, and specifically with reference to glass containers, it is understood that module 124 may instead use algorithm 400 to augment images of other types of samples (e.g., plastic containers, vehicle body components, etc.).

Initially, at block 402, module 124 loads a defect image, and a container image without the defect shown in the defect image, into memory (e.g., memory unit 114). The container image (e.g., a syringe, cartridge, or vial similar to one of the containers shown in FIGS. 3A through 3C) may be a real image captured by visual inspection system 102 of FIG. 1 or visual inspection system 200 of FIG. 2, for example. Depending on the implementation, the real image may have been processed in other ways (e.g., cropped, filtered, etc.) prior to block 402. The defect image may be a particular type of defect (e.g., scratch, crack, stain, foreign object, malformed plunger, cracked cake, etc.) that module 124 obtains from feature image library 142, for example.

Figure 5:
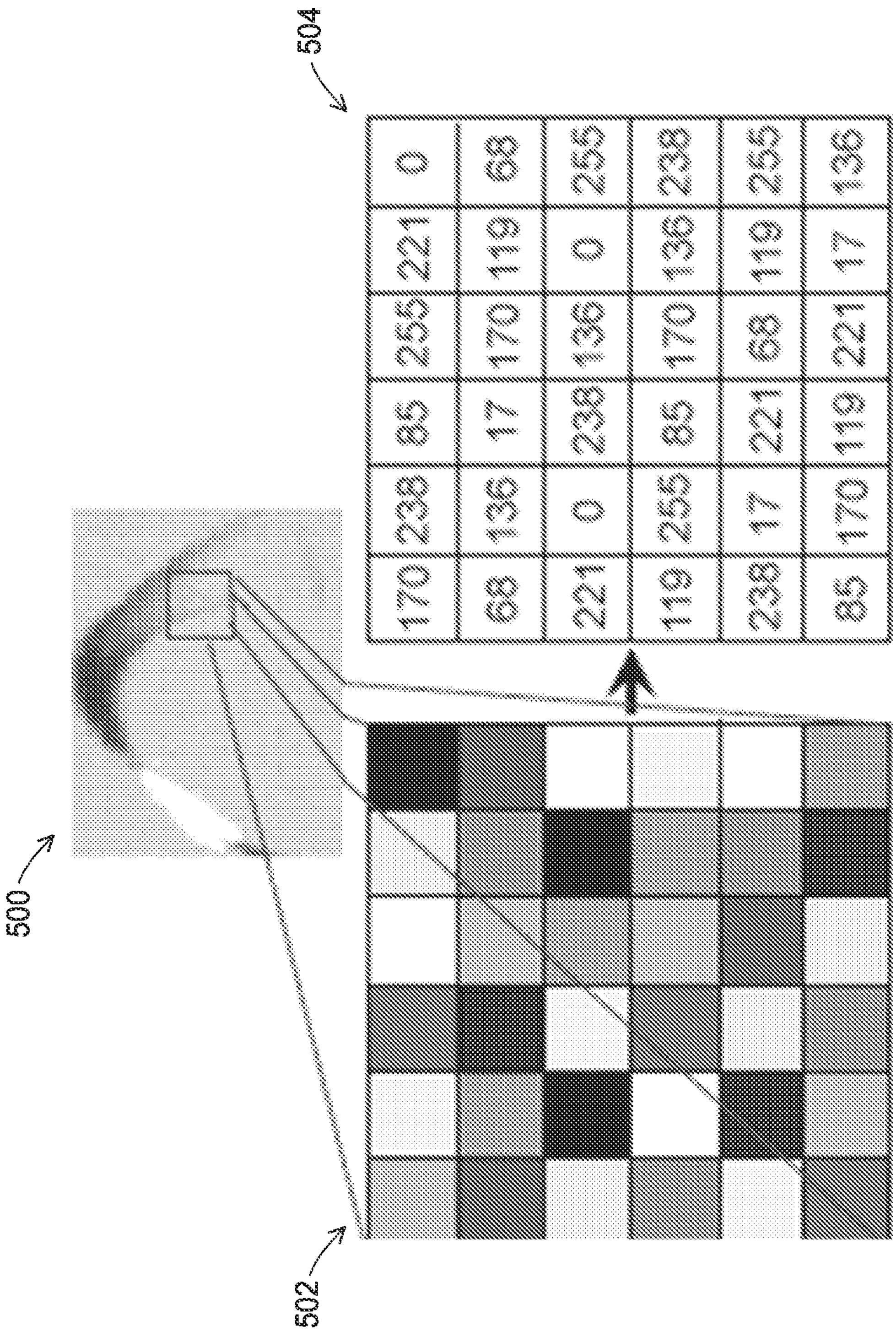
FIG. 5 depicts an example operation in which a feature image is converted to a numeric matrix.

At block 404, module 124 converts the defect image and the container image into respective two-dimensional, numeric matrices, referred to herein as a "defect matrix" and a "container image matrix," respectively. Each of these numeric matrices may include one matrix element for each pixel in the corresponding image, with each matrix element having a numeric value representing the (grayscale) intensity value of the corresponding pixel. For a typical industrial camera with an 8-bit format, for example, each matrix element may represent an intensity value from 0 (black) to 255 (white). In an implementation where containers are back-lit, for example, areas of a container image showing only glass and clear fluid may have relatively high intensity values, while areas of a container image showing a defect may have relatively low intensity values. However, the algorithm 400 can be useful in other scenarios, so long as the intensity levels of the depicted defect are sufficiently different from the intensity levels of the depicted glass/fluid areas without defects. Other numeric values may be used for other grayscale resolutions, or the matrix may have more dimensions (e.g., if the camera produces red-green-blue (RGB) color values). FIG. 5 shows an example operation in which module 124 converts a feature (crack) image 500 with grayscale pixels 502 to a feature matrix 504. For clarity, FIG. 5 shows only a portion of the pixels 502 within the feature image 500, and only a portion of the corresponding feature matrix 504.

The two-dimensional matrix produced for the container image at block 404, for a container image of pixel size m×n, can be represented as the following m×n matrix:

$$\begin{bmatrix} C_{11} & C_{12} & \dots & C_{1n} \\ C_{21} & C_{22} & \dots & C_{2n} \\ C_{31} & C_{32} & \dots & C_{3n} \\ \vdots & \vdots & \ddots & \vdots \\ C_{m1} & C_{m2} & \vdots & C_{mn} \end{bmatrix}$$

For example, $C_{11}$ represents the value (e.g., from 0 to 255) of the top left pixel of the container image. The number of rows m and the number of columns n can be any suitable integers, depending on the image resolution required and the processing capabilities of computer system 104. Module 124 generates a similar, smaller matrix for the defect image:

$$\begin{bmatrix} D_{11} & D_{12} & \dots & D_{1k} \\ D_{21} & D_{22} & \dots & D_{2k} \\ D_{31} & D_{32} & \dots & D_{3k} \\ \vdots & \vdots & \ddots & \vdots \\ D_{j1} & D_{j2} & \vdots & D_{jk} \end{bmatrix}$$

The size of the defect matrix may vary depending on the defect image size (e.g., an 8×8 image and matrix for a small particle, or a 32×128 image and matrix for a long, meandering crack, etc.).

At block 406, library expansion module 124 sets limits on where the defect can be placed within the container image. For example, module 124 may not permit transposition of the defect to an area of the container with a large discontinuity in intensity and/or appearance, e.g., by disallowing transposition onto an area outside of a translucent fluid within a transparent container. In other implementations, defects can be placed anywhere on a sample.

At block 408, module 124 identifies a "surrogate" area in the container image, within any limits set at block 406. The surrogate area is the area upon which the defect will be transposed, and thus is the same size as the defect image. Module 124 may identify the surrogate area using a random process (e.g., randomly selecting x- and y-coordinates within the limits set at block 406), or may set the surrogate area at a predetermined location (e.g., in implementations where, in multiple iterations of the algorithm 400, module 124 steps through different transpose locations with regular or irregular intervals/spacing).

At block 410, module 124 generates a surrogate area matrix corresponding to the surrogate area of the container image. The matrix may be formed by converting the intensity of the pixels in the original container image, at the surrogate area, to numeric values, or may be formed simply by copying numeric values directly from the corresponding portion of the container image matrix generated at block 404. In either case, the surrogate area matrix corresponds to the precise location/area of the container image upon which the defect will be transposed, and is equal in size and shape (i.e., number of rows and columns) to the defect matrix. The surrogate area matrix may therefore have the form:

$$\begin{bmatrix} S_{11} & S_{12} & \dots & S_{1k} \\ S_{21} & S_{22} & \dots & S_{2k} \\ S_{31} & S_{32} & \dots & S_{3k} \\ \vdots & \vdots & \ddots & \vdots \\ S_{j1} & S_{j2} & \vdots & S_{jk} \end{bmatrix}$$

Figure 4B:
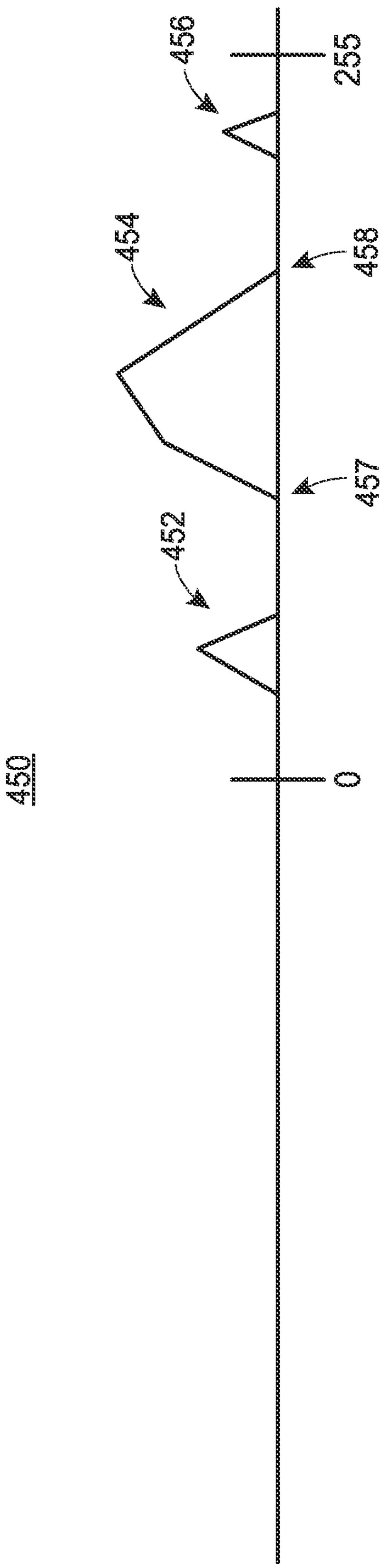
FIGS. 4B and 4C depict example defect matrix histograms that may be generated during the arithmetic transposition algorithm of FIG. 4A.

At block 412, for each row in the defect matrix, module 124 generates a histogram of element values. An example defect histogram 450 for a single row of the defect matrix is shown in FIG. 4B. In the histogram 450, a first peak portion 452 corresponds to relatively low-intensity pixel values for areas of the defect image that depict the defect itself, a second peak portion 454 corresponds to relatively moderate-intensity pixel values for areas of the defect image that depicts only glass/fluid (without the defect), and a third peak portion 456 corresponds to relatively high-intensity pixel values for areas of the defect image that depict reflections of light from the defect. To ensure that the histogram 450 includes the peak portion 454, careful selection of the defect image size is important. In particular, the defect image loaded at block 402 should be large enough to capture at least some glass areas (i.e., without a defect), across every row of the defect image.

For each row of the defect matrix, module 124 also (at block 412) identifies a peak portion that corresponds to the depicted glass without the defect (e.g., peak portion 454 in histogram 450), and normalizes the element values of that row of the defect matrix relative to a center of that peak portion. In some implementations, the defect image dimensions are selected such that the peak portion with the highest peak will correspond to the glass/non-defect area of the defect image. In these implementations, module 124 may identify the peak portion corresponding to the depicted glass (without defect) by choosing the peak portion with the highest peak value. Module 124 may determine the "center" of the peak portion in various ways, depending on the implementation. For example, module 124 may determine low-side and high-side intensity values of the peak portion (denoted in the example histogram 450 as low-side value (LSV) 457 and high-side value (HSV) 458, respectively), and then compute the average of the two (i.e., Center=(HSV−LSV)/2). Alternatively, module 124 may compute the center as the median intensity value, or the intensity value corresponding to the peak of the peak portion, etc. The HSV and LSV values for a defect image may be fairly close together, e.g., on the order of 8 to 10 grayscale levels apart.

Figure 4C:
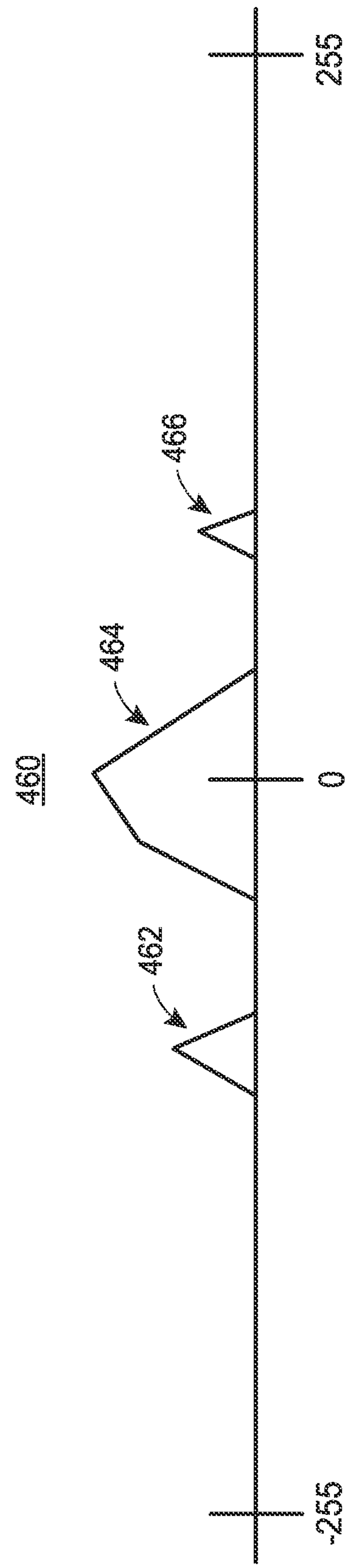

To normalize the defect matrix, module 124 subtracts the center value from each element value in the row. An example of this is shown in FIG. 4C, where the defect image with histogram 450 has been normalized such that the normalized defect matrix has histogram 460. As seen in FIG. 4C, in this example, peak portion 452 has been translated to a peak portion 462 that includes only negative values, peak portion 454 has been translated to a peak portion 464 centered on an element value of zero, and peak portion 456 has been translated to a peak portion 466 that includes only positive values. It is understood that module 124 does not necessarily generate histogram 460 when executing the algorithm 400. In effect, the normalized defect matrix is a "flattened" version of the defect matrix, with surrounding glass (and possibly fluid, etc.) values being canceled out while retaining information representative of the defect itself. When performed for all rows, the normalized defect matrix may be expressed as:

$$\begin{bmatrix} N_{11} & N_{12} & \dots & N_{1k} \\ N_{21} & N_{22} & \dots & N_{2k} \\ N_{31} & N_{32} & \dots & N_{3k} \\ \vdots & \vdots & \ddots & \vdots \\ N_{j1} & N_{j2} & \vdots & N_{jk} \end{bmatrix}$$

At block 414, module 124 generates a similar histogram for each row of the surrogate area matrix, identifies a peak portion corresponding to glass/fluid depicted in the surrogate area, and records a low-side value and high-side value for that peak portion. In implementations/scenarios where the container image does not depict any defects, there may be only one peak in the histogram (e.g., similar to peak portion 450 with LSV 457 and HSV 458). Because lighting (and possibly other) conditions are not exactly the same when the defect and container images are captured, the peak portion identified at block 414 will be different in at least some respects from the defect image peak portion identified at block 412.

It is understood that the algorithm 400 may be performed on a per-row basis as discussed above, or on a per-column basis. Performing the operations of blocks 412 and 414 on a per-row or per-column basis can be particularly advantageous when a cylindrical container is positioned orthogonally to the camera with the center/long axis of the container extending horizontally or vertically across the container image. In such configurations, depending on the illumination type and positioning, variations in appearance tend to be more abrupt in one direction (across the diameter or width of the container) and less abrupt in the other direction (along the long axis of the container), and thus less information is lost by normalizing, etc., for each row or each column (i.e., whichever corresponds to the direction of less variation). In some implementations (e.g., if imaging vials from the bottom side), blocks 412 and 414 may involve other operations, such as averaging values within two-dimensional areas (e.g., 2×2, or 4×4, etc.) of the surrogate area matrix, etc.

At blocks 416 through 420, module 124 maps the normalized defect matrix onto the surrogate area of the container image matrix by iteratively performing a comparison for each element of the defect matrix (e.g., by scanning through the defect matrix starting at element $D_{11}$). For a given element of the normalized defect matrix, at block 416, module 124 adds the value of that element to the corresponding element value in the surrogate area matrix, and determines whether the resulting sum falls between the low-side and high-side values for the corresponding row (as those values were determined at block 414). If so, then at block 418A module 124 retains the original value for the corresponding element in the surrogate area of the container image matrix.

If not, then at block 418B module 124 adds the normalized defect matrix element value to the value of the corresponding element of the container image matrix. If element $N_{11}$ is outside the range [LSV,HSV], for example, then module 124 sets the corresponding element in the container image equal to ($N_{11}$+$S_{11}$). As indicated at block 420, module 124 repeats block 416 (and block 418A or block 418B as appropriate) for each remaining element in the normalized defect matrix. At block 422, module 124 confirms that all values of the modified container image (at least in the surrogate area) are valid bitmap values (e.g., between 0 and 255, if an 8-bit format is used), and at block 424 module 124 converts the modified container image matrix to a bitmap image, and saves the resulting "defect" container image (e.g., in training image library 140). The net effect of blocks 416 through 420 is to "catch" or maintain defect image pixels that are less intense (darker) than the glass (or other translucent material) levels in the container image, as well as pixels that are more intense (brighter/whiter) than the glass levels (e.g., due to reflections in the defect).

It is understood that the various blocks described above for the algorithm 400 may differ in other implementations, including in ways other than (or in addition to) the various alternatives discussed above. As just one example, the loop of blocks 416 through 420 may involve first merging the normalized defect matrix with the surrogate area matrix (on an element-by-element basis as described above for the container image matrix) to form a replacement matrix, and then replacing the corresponding area of the container image matrix with the replacement matrix (i.e., rather than directly modifying the entire container image matrix). As another example, blocks 416A and 416B may instead operate to modify the normalized defect matrix (i.e., by changing an element value to zero in each case where block 418A is performed), after which the modified version of the normalized defect matrix is added to the surrogate area of the container image matrix. Moreover, the algorithm 400 may omit one or more operations discussed above (e.g., block 406), and/or may include additional operations not discussed above.

In some embodiments and/or scenarios, the algorithm 400 includes rotating and/or scaling/resizing the defect image (loaded at block 402), or the numeric matrix derived from the defect image (at block 404), prior to transposing the defect onto the surrogate area of the container image. For example, rotation and/or resizing the defect image or numeric matrix may occur at any time prior to block 412 (e.g., just prior to any one of blocks 410, 408, 406, and 404). Rotation may be performed relative to a center point or center pixel of the defect image or numeric matrix, for example. Resizing may include enlarging or shrinking the defect image or numeric matrix along one or two axes (e.g., along the axes of the defect image, or along long and short axes of the depicted defect, etc.). Generally, scaling/resizing an image involves mapping groups of pixels to single pixels (shrinking) or mapping single pixels to groups of pixels (enlarging/stretching). It is understood that similar operations are required with respect to matrix elements rather than pixels, if the operation(s) are performed upon a numeric matrix derived from the defect image. Once the defect image or numeric matrix has been rotated and/or resized, the remainder of the algorithm 400 may be unchanged (i.e., may occur in the same manner described above, and be agnostic as to whether any rotation and/or resizing has occurred).

Rotating and/or resizing (e.g., by the library expansion module 124 implementing the arithmetic transposition algorithm 400) can help to increase the size and diversity of the feature image library 142 well beyond what would otherwise be possible with a fixed set of defect images. Rotation may be particularly useful in use cases where (1) the imaged container has significant rotational symmetry (e.g., the container has a surface of circular or semi-circular shape that is to be imaged during inspection), and (2) the imaged defect is of a type that tends to have visual characteristics that are dependent upon that symmetry. For example, on a circular or near-circular bottom of a glass vial, some cracks may tend to propagate generally in the direction from the center to the periphery of the circle, or vice versa. The library expansion module 124 may rotate a crack or other defect such that an axis of the defect image aligns with a rotational position of the surrogate area upon which the defect is being transposed, for example. More specifically, the amount of rotation may be dependent upon both the rotation of the defect in the original defect image and the desired rotation (e.g., the rotation corresponding to the surrogate area to which the defect is being transposed).

Any suitable techniques may be used to achieve the pixel (or matrix element) mapping needed for the desired rotation and/or resizing, such as Nearest Neighbor, Bilinear, High Quality Bilinear, Bicubic, or High Quality Bicubic. Of the five example techniques listed above, Nearest Neighbor is the lower quality technique, and High Quality Bicubic is the highest quality technique. However, the highest quality technique may not be optimal, given that the goal is to make the rotated and/or resized defect have an image quality very similar to the image quality provided by the imaging system that will be used for inspection (e.g., visual inspection system 102). Manual user review may be performed to compare the output of different techniques such as the five listed above, and to choose the technique that is best in a qualitative/subjective sense. In some implementations, High Quality Bicubic is used, or is used as a default setting.

The algorithm 400 (with and/or without any rotation and/or resizing) can be repeated for any number of different "good" images and any number of "defect" images, in any desired combination (e.g., applying each of L defect images to each of M good container images in each of N locations, to generate L×M×N synthetic images based on M good container images in the training image library 140). Thus, for example, 10 defect images, 1,000 good container images, and 10 defect locations per defect type can result in 100,000 defect images. The locations/positions on which defects are transposed for any particular good container image may be predetermined, or may be randomly determined (e.g., by module 124).

The algorithm 400 can work very well even in situations where a defect is transposed onto a surrogate area that includes sharp contrasts or transitions in pixel intensity levels due to one or more features. For example, the algorithm 400 can work well even if the surrogate area of a glass syringe includes a meniscus and areas on both sides of the meniscus (i.e., air and fluid, respectively). The algorithm 400 can also handle certain other situations where the surrogate area is very different than the area surrounding the defect in the defect image. For example, the algorithm 400 can perform well when transposing a defect, from a defect image of a glass syringe filled with a transparent fluid, onto a vial image in a surrogate area where the vial is filled with an opaque, lyophilized cake. However, it may be beneficial to modify the algorithm 400 for some use cases or scenarios. If the surrogate area of the container image depicts a transition between two very different areas (e.g., between glass/air and lyophilized cake portions of a vial image), for example, module 124 may split the surrogate area matrix into multiple parts (e.g., two matrices of the same or different size), or simply form two or more surrogate area matrices in the first instance. The corresponding parts of the defect image can then be separately transposed onto the different surrogate areas, using different instances of the algorithm 400 as discussed above.

In some implementations, the defects and/or other features depicted in images of feature image library 142 can be morphed in one or more ways prior to module 124 using the algorithm 400 to add those features to an original image. In this manner, module 124 can effectively increase the size and variability of feature image library 142, and thus increase the size and variability of training image library 140. For example, module 124 may morph defects and/or other features by applying rotations, scaling/stretching (in one or two dimensions), skewing, and/or other transformations. Additionally or alternatively, depicted features may be modified in more complex and/or subtle ways. For example, module 124 may fit a defect (e.g., a crack) to different arcs, or to more complex crack structures (e.g., to each of a number of different branching patterns). By its nature, the pixel-based algorithm 400 is well equipped to handle these types of fine feature controls/modifications.

Figure 6:
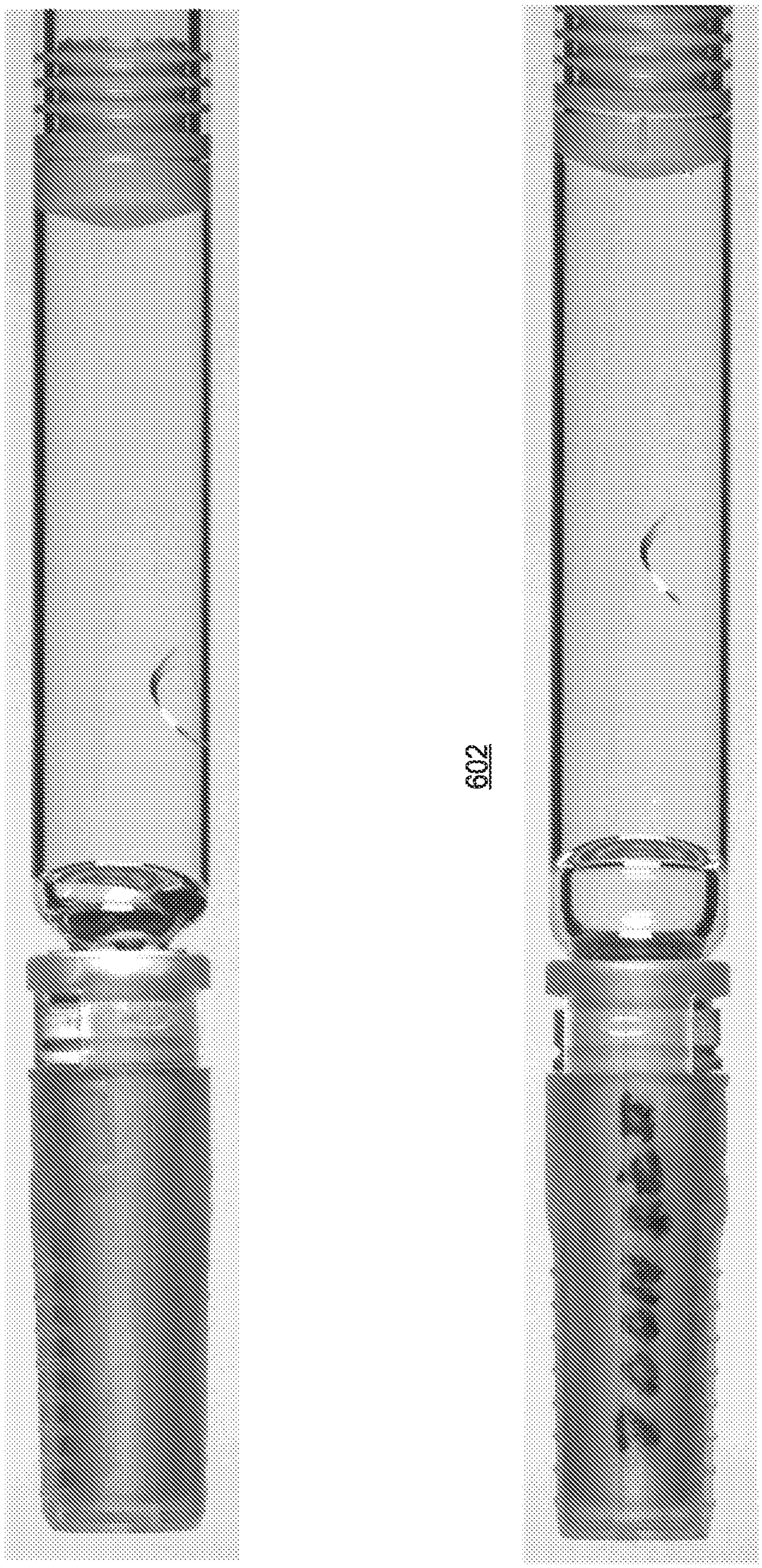
FIG. 6 compares an image of a syringe with a manually-generated, real-world crack to a synthetic image of a syringe with a digitally-generated crack, with the synthetic image being generated using the arithmetic transposition algorithm of FIG. 5.
Figure 7:
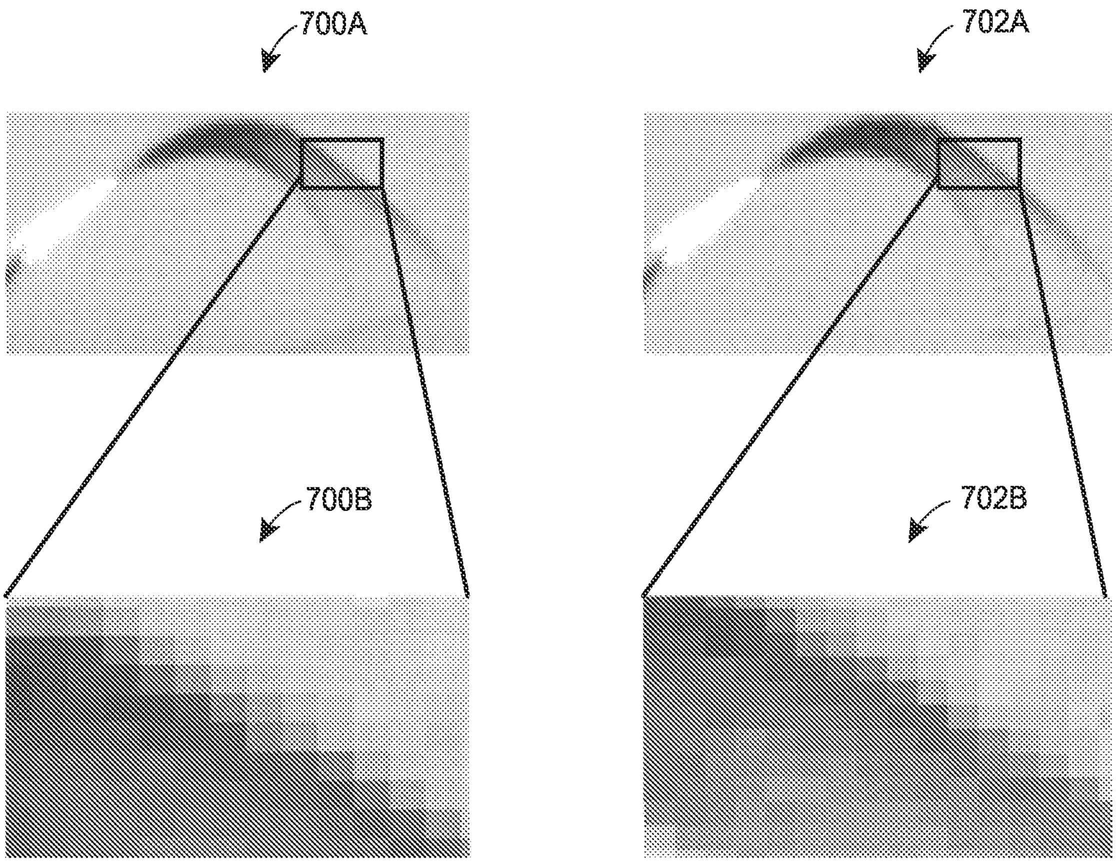
FIG. 7 is a pixel-level comparison corresponding to the images of FIG. 7.

The synthetic images generated using the arithmetic transposition algorithm 400 of FIG. 5 can be extremely realistic, as can be seen in FIG. 6. FIG. 6 compares a real image 600 of a syringe with a manually-generated, real-world crack to a synthetic image 602 of a syringe with a crack artificially generated using the algorithm 400. Furthermore, the "realism" of the synthetic image can extend down to the pixel level. FIG. 7 provides a pixel-level comparison corresponding to the images 600, 602 of FIG. 6. Specifically, image portion 700A is a magnified view of the real-world defect in container image 600, and image portion 702A is a magnified view of the artificial defect in container image 602. Image portion 700B is a further-magnified view of image portion 700A, and image portion 702B is a further-magnified view of image portion 702A. As seen from the image portions 700B and 702B, there are no easily observable pixel-level artifacts or other dissimilarities created by transposing the defect.

Figure 8:
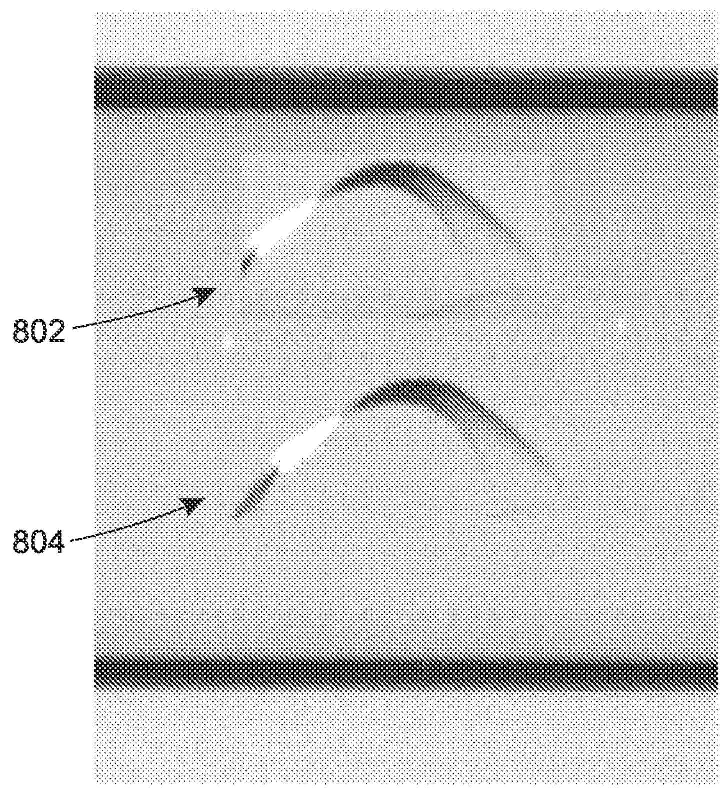
FIG. 8 compares a defect synthesized using a conventional technique with a defect synthesized using the arithmetic transposition algorithm of FIG. 5.

Without this pixel-level realism, an AVI neural network might focus on the "wrong" characteristics (e.g., pixel-level artifacts) when determining that a synthetic image is defective. While the material (e.g., glass or plastic) of a container may appear to the naked eye as a homogenous surface, characteristics of the illumination and container material (e.g., container curvature) in fact cause pixel-to-pixel variations, and each surrogate area on a given container image differs in at least some respects from every other potential surrogate area. Moreover, differences between the conditions/materials (e.g., illumination and container material/shape) used when capturing the defect images, as compared to the conditions/materials used when capturing the "good" container images, can lead to even larger variations. A potential example of this is illustrated in FIG. 8, which shows a composite synthetic image 800 with both a first transposed defect 802 and a second transposed defect 804. The first transposed defect 802 is created using a conventional, simple technique of superimposing a defect image directly on the original container image, while the second transposed defect 804 is created using the arithmetic transposition algorithm 400. As seen in FIG. 8, the boundaries of the defect image corresponding to the first transposed defect 802 can clearly be seen. An AVI neural network trained using synthetic images with defects such as the first transposed defect 802 may simply look for a similar boundary when inspecting containers, for example, which might result in a large number of false negatives and/or other inaccuracies.

Figure 9A:
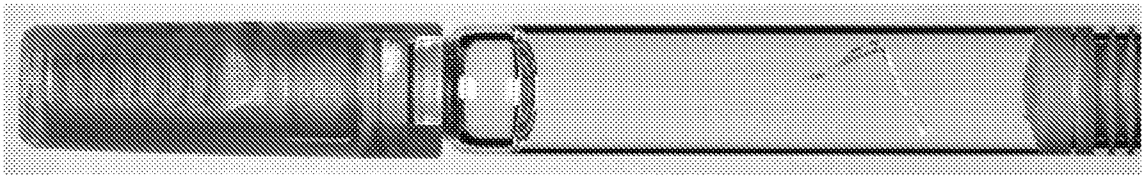
FIG. 9A depicts various synthetic images with defects, generated using the arithmetic transposition algorithm of FIG. 5.
Figure 9A:
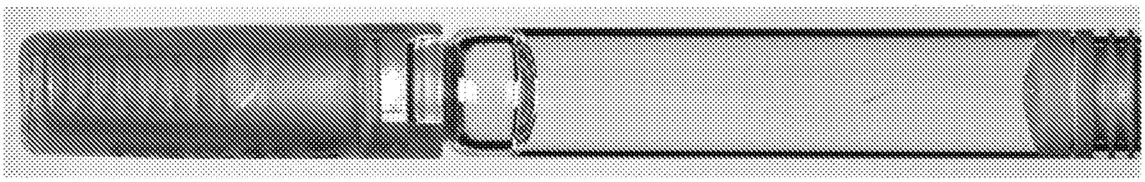
Figure 9A:
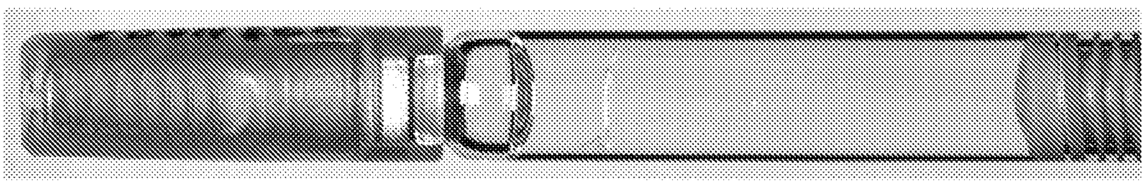
Figure 9A:
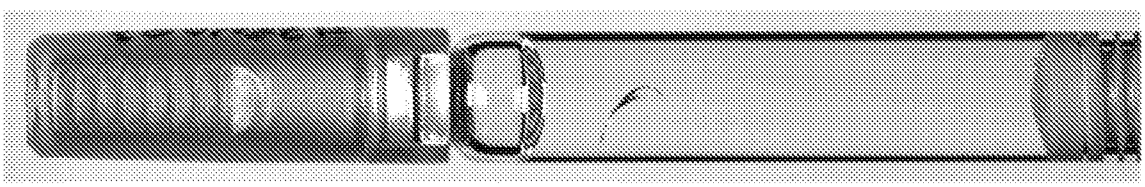
Figure 9A:
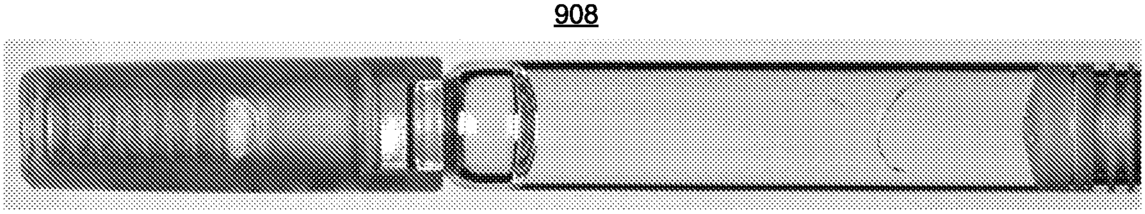
Figure 9A:
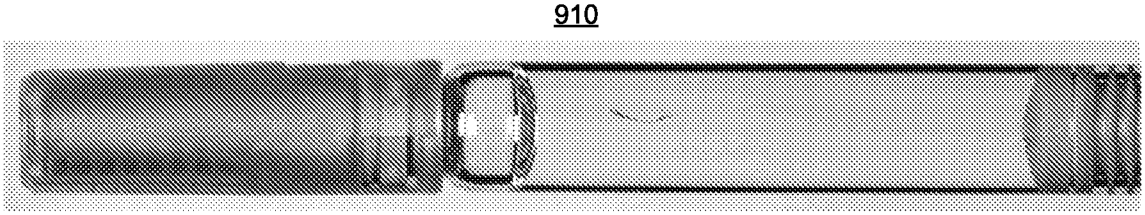

FIG. 9A depicts various other synthetic images with added defects, labeled 900 through 910, that were generated using an implementation of the arithmetic transposition algorithm 400. In each case, the portion of the syringe image depicting the defect seamlessly blends in with the surrounding portions of the image, regardless of whether the image is viewed at the macroscopic level or at the pixel level.

Figure 9B:
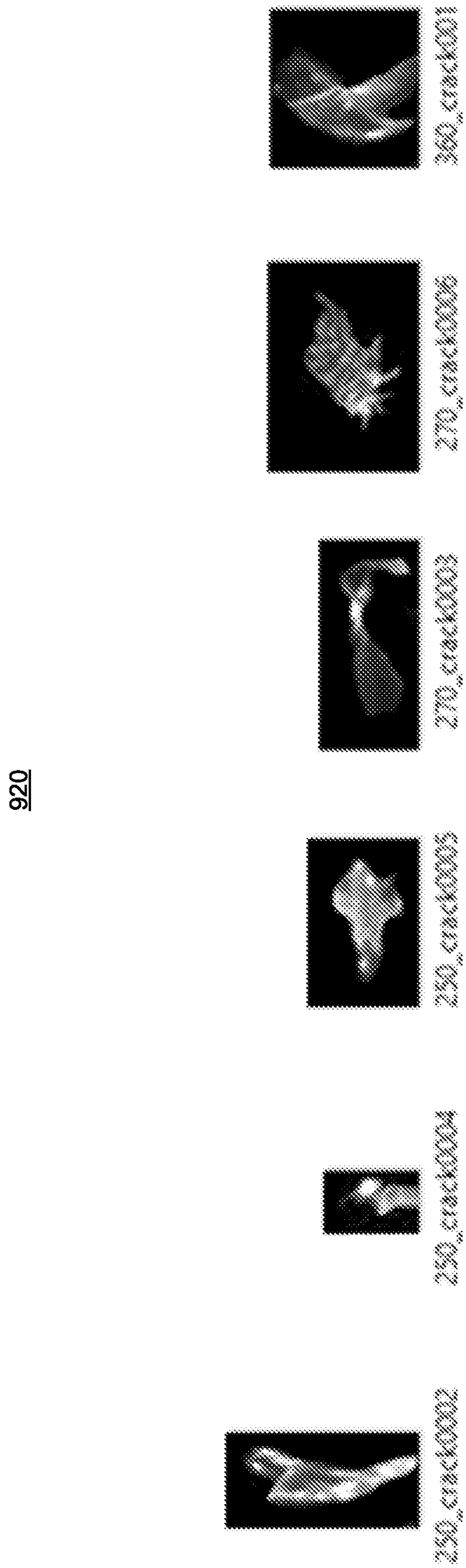
FIG. 9B depicts a collection of example crack defect images, each of which may be used as an input to the arithmetic transposition algorithm of FIG. 5.

FIG. 9B depicts a collection of example crack defect images 920, any of which may be used as an input to the arithmetic transposition algorithm 400. In some implementations, as noted above, the arithmetic transposition algorithm 400 may include rotating and/or resizing a given defect image (or corresponding numeric matrix) before performing the remainder of the algorithm 400. In cases where rotation is desired, it is generally important to know the rotation corresponding to the original defect image. In the example crack defect images 920, for instance, the rotation/angle corresponding to the original image is included in the filename itself (shown in FIG. 9B just below each image). Thus, for example, "250_crack0002" may be a particular crack at a 250 degree rotation (such that positioning the crack where 180 degrees of rotation is desired would require rotating the crack counter-clockwise by 70 degrees), "270_crack0003" may be another crack at a 270 degree rotation (such that positioning the crack where 180 degrees of rotation is desired would require rotating counter-clockwise by 90 degrees), and so on. The library expansion module 124 may calculate the degrees of rotation to apply based on this indicated original rotation and the desired rotation (e.g., the rotation corresponding to an angular position of the surrogate area upon which the defect is being transposed).

The arithmetic transposition algorithm 400 can be implemented in most high-level languages, such as C++, .NET environments, and so on. Depending on the processing power of processing unit 110, the algorithm 400 can potentially generate thousands of synthetic images in a 15 minute period or less, although rotation and/or resizing generally increases these times. However, running time is generally not an important issue (even with rotation and/or resizing), as the training images do not need to be generated in real time for most applications.

As described in U.S. Provisional Patent Application No. 63/020,232, various image processing techniques may be used to measure key metrics of each available image, allowing for the careful curation of training image libraries such as training image library 140. During the development of the arithmetic transposition algorithm 400 described above, it was discovered that careful control of certain parameters can be critical. For example, when considering 1 ml glass syringes, the position of the liquid meniscus and plunger (e.g., rubber plunger) in the images can be critical attributes that may vary from image to image. If the synthetic images are all created with the same "good" container image (or with too small, and/or too similar, a set of good container images), the subsequent training of deep learning AVI models may be undermined by biases arising from the lack of variability in the images.

By using key image metrics, one can carefully select a library of "good" images to be augmented (e.g., using the algorithm 400), such that these biases are reduced or avoided. Such metrics can also be used to blend training image libraries, such that the resulting, composite library contains not only an appropriate balance of real and synthetic images, but also displays a natural distribution of each of the key metrics.

To assess the quality of synthetic images generated using the algorithm 400, including the robustness of AVI deep learning models trained on such images, various experiments were performed. For these experiments, four datasets with approximately 300 images each were used: (1) a set of "Real No Defect" images, which were real images of syringes with no visible defects captured by a Cartesian robot-based system in a laboratory setting; (2) a set of "Real Defect" images, which were real images of syringes with cracks of different sizes at different locations, and also captured by the Cartesian robot-based system in a laboratory setting; (3) a set of "Synthetic No Defect" images, which were synthesized images created by removing the depicted crack from the Real Defect Images without altering the plunger and meniscus positions; and (4) a set of "Synthetic Defect" images, which were synthesized images created by adding a depiction of a crack to the Real No Defect images, with random placement in the x- and y-directions. The Synthetic Defect images were generated using an implementation of the arithmetic transposition algorithm 400. The syringes in the Real No Defect images and Real Defect images had meniscuses at different positions.

The AVI deep learning model was trained using different combinations of percentages of images from the real and augmented datasets (0%, 50%, or 100%). For each combination, two image libraries were blended: a good (no defect) image library and a defect image library, with approximately 300 images each. During training, each of these two libraries was split into three parts, with 70% of the images used for training, 20% used for validation, and 10% used for the test dataset. A pre-trained ResNet50 algorithm was used to train the model using HALCON® software to classify the input images into defect or no-defect classes. After training the deep learning model, its performance was evaluated using the test dataset. It was observed that when the model was trained with 0% real images (i.e., 100% synthetic images), the accuracy for the augmented test set was higher than for the real dataset. When the model was trained with 100% real images (i.e., 0% synthetic images), the accuracy for the real dataset was higher than for the augmented dataset. When the model was trained using 50% real and 50% synthetic images, accuracy was similar, and high, for both the real and augmented datasets. From these experiments, it was concluded that as the percentage of either real or synthetic images increases in the training dataset, the accuracy of the deep learning model for the respective dataset (real or augmented) increases accordingly.

One possible reason for lower model accuracy with respect to synthetic/augmented test images when the model is trained with 100% real images may be the different meniscuses in the syringes of the training and testing image sets. The model trained with 0% real images and tested with only real images sometimes incorrectly classified the test image due to different meniscuses. Similarly, when trained with 100% real images and tested using only synthetic images, the model sometimes incorrectly classified the test image due to different meniscuses. These incorrectly classified images were evaluated by visualizing heatmaps generated using the Gradient Class Activation Map (Grad-CAM) algorithm. Heatmaps of this sort are discussed in more detail in U.S. Provisional Patent Application No. 63/020,232. In such a case, the image augmentation techniques discussed herein could be used to improve classifier performance by adding variability to the meniscuses in the training images.

After the model was trained, and after the above testing showed that the model was trained properly, a "final test" phase was performed. For this phase, four datasets of the same general types discussed above ("Real No Defect," "Real Defect," "Synthetic No Defect," and "Synthetic Defect") were again used, but with all images being from another source (i.e., with all images being of products different than those used in the training/validation/test phase), and with all images being used only for testing model performance (i.e., with none of the images being used for model training). Similar trends were observed for this second phase, with model accuracy increasing for real "final test" images when the model was trained with a higher percentage of real images, and with model accuracy increasing for synthetic "final test" images when the model was trained with a higher percentage of synthetic images.

Figure 10:
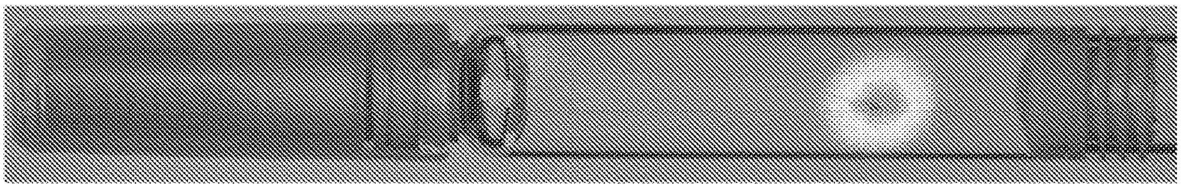
FIG. 10 depicts heatmaps used to assess the efficacy of augmented images.
Figure 10:
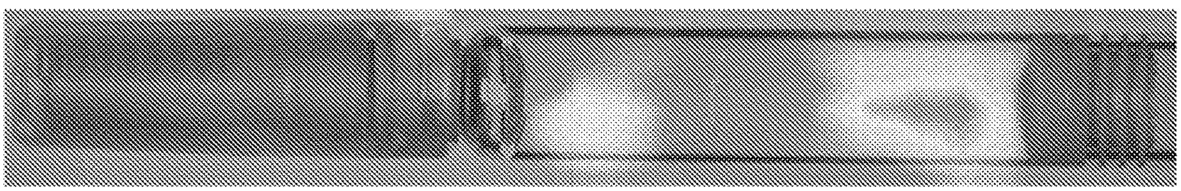
Figure 10:
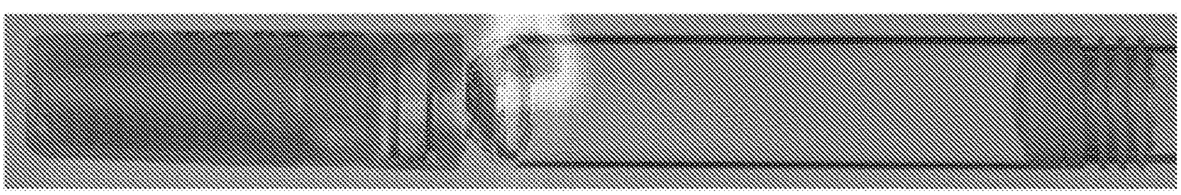

FIG. 10 depicts various Grad-CAM-generated heatmaps 1000, 1002, and 1004 that were used to assess the efficacy of synthetic images. Heatmap 1000 reflects a "true positive," i.e., where the AVI neural network correctly identified a digitally-added crack. That is, as seen in FIG. 10, the pixels associated with the crack were the pixels that the AVI neural network relied most upon to make the "defect" inference. Heatmap 1002, however, reflects a "false positive," in which the AVI neural network classified the synthetic image as a defect image, but for the wrong reason (i.e., by focusing on areas away from the digitally-added crack). Heatmap 1004 reflects a "false negative," in which the AVI neural network was unable to classify the synthetic image as defective because the model is overly focused on the area of the meniscus. This misclassification is a result of the synthetic "defect" training images having a meniscus similar to the "no defect" test images. This is most likely to occur when training is performed with 100% real images before running the model on synthetic images, or when training is performed with 100% synthetic images before running the model on real images. If the training mix is instead about 50% real images and 50% synthetic images, such failure is drastically reduced.

AVI neural network performance was also measured by generating confusion matrices for the AVI model when using different combinations of real and synthetic images as training data. When training the AVI model on 100% synthetic images, model performance for a set of 100% synthetic images was:

| | Ground truth: Defect | Ground truth: No defect |
|---|---|---|
| Prediction: Defect | 278 | 0 |
| Prediction: No defect | 2 | 307 |

When training the AVI model on 50% real images and 50% synthetic images, model performance for a set of 100% synthetic images was:

| | Ground truth: Defect | Ground truth: No defect |
|---|---|---|
| Prediction: Defect | 271 | 1 |
| Prediction: No defect | 9 | 306 |

When training the AVI model on 100% real images, model performance for a set of 100% synthetic images was:

| | Ground truth: Defect | Ground truth: No defect |
|---|---|---|
| Prediction: Defect | 97 | 307 |
| Prediction: No defect | 183 | 0 |

When training the AVI model on 100% synthetic images, model performance for a set of 100% real images was:

| | Ground truth: Defect | Ground truth: No defect |
|---|---|---|
| Prediction: Defect | 232 | 268 |
| Prediction: No defect | 104 | 32 |

When training the AVI model on 50% real images and 50% synthetic images, model performance for a set of 100% real images was:

| | Ground truth: Defect | Ground truth: No defect |
|---|---|---|
| Prediction: Defect | 328 | 5 |
| Prediction: No defect | 8 | 295 |

When training the AVI model on 100% real images, model performance for a set of 100% real images was:

| | Ground truth: Defect | Ground truth: No defect |
|---|---|---|
| Prediction: Defect | 336 | 4 |
| Prediction: No defect | 0 | 296 |

Figure 11:
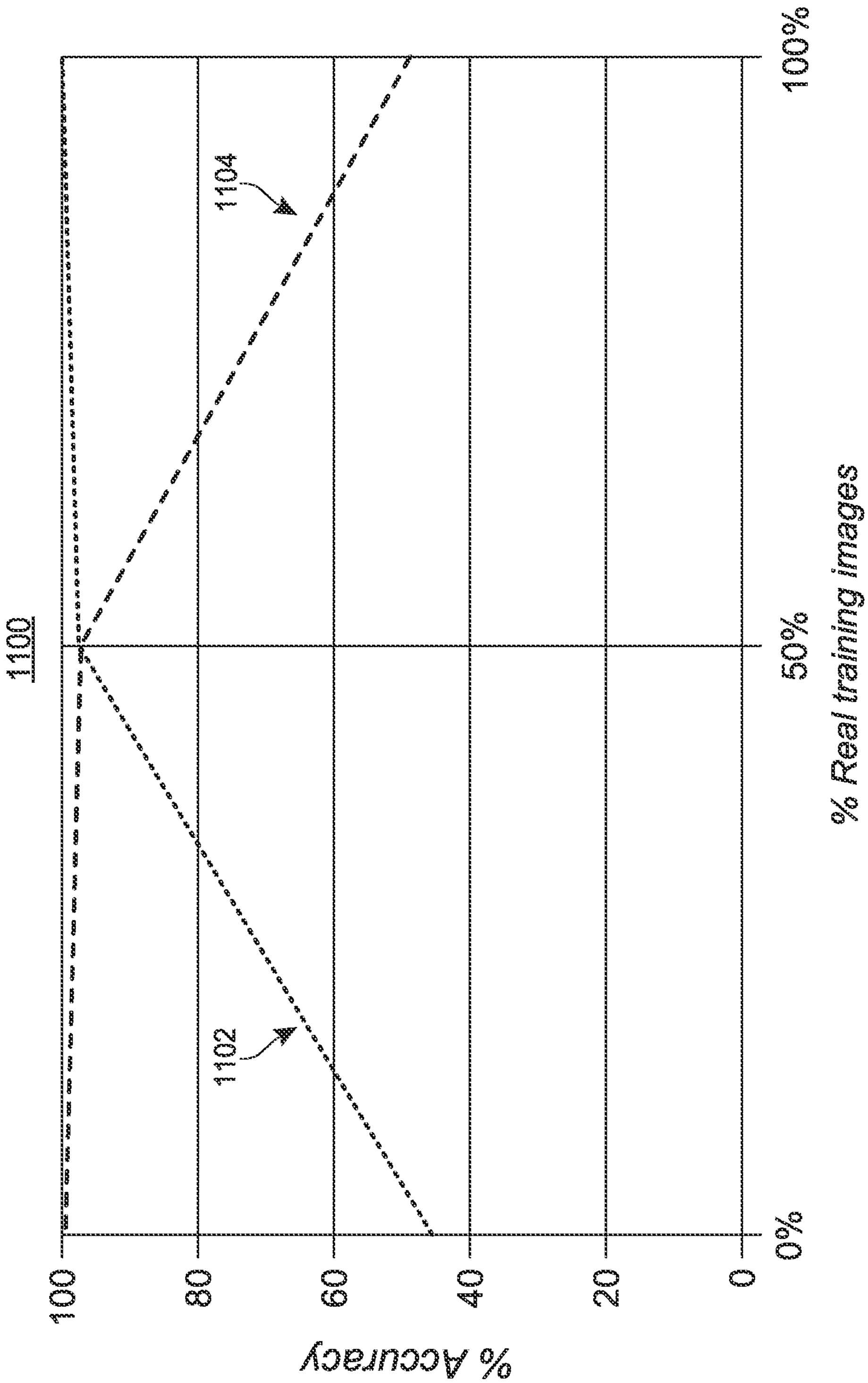
FIG. 11 is a plot showing AVI neural network performance, for different combinations of synthetic and real images in the training and test image sets.

These results are also reflected in FIG. 11, which is a plot 1100 showing AVI neural network performance for different combinations of synthetic and real images in the training and test image sets. In the plot 1100, the x-axis represents the percentage of real images in the training set, with the remainder being synthetic/augmented images, and the y-axis represents the percentage accuracy of the trained AVI model. The trace 1102 corresponds to testing performed on 100% real images, and the trace 1104 corresponds to testing performed on 100% synthetic images. As can be seen from the plot 1100 and the above confusion matrices, a mix of approximately 50% real images and 50% synthetic images (e.g., in training image library 140) appears to be optimal (about 98% accuracy). Of course, the sparseness of data points in the plot 1100 may mean that the optimum point is somewhat above or below 50% real images. For example, if a 5 to 10% lower percentage of real training images were to result in something that is still very close to 98% accuracy, it may be desirable to accept the small decrease in performance (when testing on real images) in order to gain the cost/time savings of developing a training image library with a higher proportion of synthetic images.

The discussion above primarily relates to the generation of synthetic "defect" images, i.e., augmenting a "good" real image by adding an artificial but realistically-depicted defect. In some cases, however, it may be advantageous to create synthetic "good" images from real images that depict defects or anomalies. This can further expand the training image library, while also helping to balance the characteristics of "defect" and "no defect" images in the training image library. In particular, defect removal can reduce non-causal correlations by the AVI model, by providing complementary counter examples to images depicting defects. This in turn encourages the AVI model to focus on the appropriate region of interest to identify causal correlations that can, in some cases, be quite subtle.

In some implementations, defect (or other feature) removal is performed on a subset of images that exhibit the defect of interest, after which both the synthetic (no defect) and corresponding original (defect) images are included in the training set (e.g., in training image library 140). AVI classification models trained with good images, unrelated to the defect samples, but with about 10% of the training images being synthetic "good" images created from defect images, have been shown to match or exceed the causal predictive performance of AVI models that are trained with good images that are entirely sourced from defect samples in which the defect artifact is not visible in the image.

The removal of features more generally (as opposed to only removing defects) can be exploited to provide more focused classification. For example, if the original images in the training set depict a particular region or regions of interest (e.g., a meniscus that can vary in appearance and position), such regions can be replaced (e.g., by removing or modifying the identifying characteristics of those regions), and the edited images added as complementary training images. This can be preferable to cropping (e.g., cropping out part of a syringe image that depicts the meniscus), e.g., if the AVI model requires a specific input size, and/or if there are multiple, dispersed regions of interest.

To remove depicted defects or other features from original images, different digital "inpainting" techniques are described herein. In some implementations, module 124 removes an image feature by first masking the defect or other feature (e.g., setting all pixels corresponding to the feature area to uniformly be minimum or maximum intensity), and then iteratively searching the masked image for a region that best "fits" the hole (masked portion) by matching surrounding pixel statistics. More specifically, module 124 may determine correspondences between (1) portions (e.g., patches) of the image that are adjacent to the masked region, and (2) other portions of the image outside the masked region. For example, module 124 may use the PatchMatch algorithm to inpaint the masked region. If the unmasked regions of the image do not exhibit the same feature (e.g., the same defect) as the masked region, module 124 will remove the feature when filling the masked region.

This inpainting technique can generally produce "smooth," realistic-looking results. However, the technique is limited by the available image statistics, and also has no concept of the theme or semantics of an image. Accordingly, some synthesized images may be subtly or even grossly unrepresentative of real "good" images. To address these concerns, in some implementations, deep learning-based inpainting is used. In these techniques, neural networks are used to map complex relationships between input images and output labels. Such models are capable of learning higher-level image themes, and can identify meaningful correlations that provide continuity in the augmented image.

In some deep learning implementations, module 124 inpaints images using a partial convolution model. The partial convolution model performs convolutions across the entire image, which adds an aspect of pixel noise and variation to the synthetic (inpainted) image and therefore slightly distinguishes the synthetic image from the original, even beyond the inpainted region. The use of synthetic images with this pixel noise/variation (e.g., by AVI neural network module 120) to train the AVI model can help prevent model overfitting, because the additional variation prevents the model from drawing an overlay-specific correlation. Thus, the AVI model can better "understand" the total image population, rather than only understanding a specific subset of that population. The result is a more efficiently trained and focused AVI deep learning model.

Figure 12:
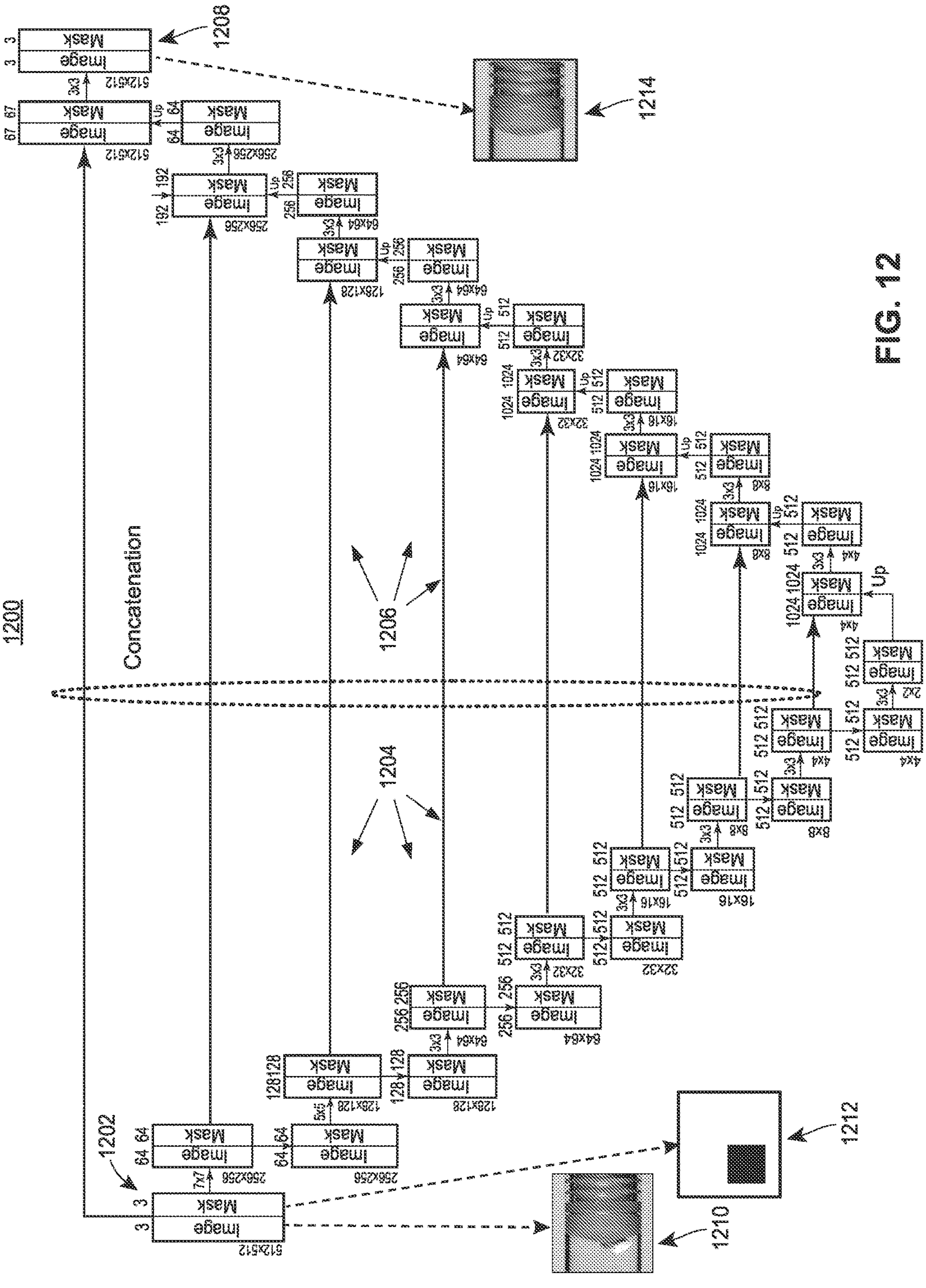
FIG. 12 depicts an example partial convolution model, which may be used to generate synthetic images by adding, removing, or modifying depicted features.

FIG. 12 depicts an example partial convolution model 1200 that module 124 may use to generate synthetic images. The general structure of the model 1200, known as a "U-Net" architecture, has been used in image segmentation applications. In the model 1200, an input image and mask pair 1202 are input (as two separate inputs having the same dimensions) to an encoder 1204 of the model 1200. In the example shown in FIG. 12, the image and mask of the input pair 1202 both have 512×512 pixels/elements, and both have three dimensions per pixel/element (to represent red, green, and blue (RGB) values). In other implementations, the image and mask of the input pair 1202 may be larger or smaller in width and height (e.g., 256×256, etc.), and may have more or fewer than three pixel dimensions (e.g., one dimension, if a grayscale image is used).

During training, when module 124 inputs a particular input and mask as input pair 1202, the model 1200 dots the image with the mask (i.e., applies the mask to the image) to form the training sample, while the original image (i.e., the image of input pair 1202) serves as the target image. At the first stage of the encoder 1204, the model 1200 applies the masked version of the input image, and the mask itself, as separate inputs to a two-dimensional convolution layer, which generates an image output and a mask output, respectively. The mask output at each stage may be clipped to the range [0, 1]. The model 1200 dots the image output with the mask output, and feeds the dotted image output and the mask output as separate inputs to the next two-dimensional convolution layer. The model 1200 iteratively repeats this process until no convolution layers remain in encoder 1204. At each successive convolution layer, while the pixel/element dimension may increase up to some value (512 in the example of FIG. 12), the sizes of the masked image and mask decrease, until a sufficiently small size is reached (2×2 in the example of FIG. 12). The encoder 1204 has N two-dimensional convolution layers, where N is any suitable integer greater than one, and is a tunable hyperparameter. Other tunable hyperparameters of the model 1200 may include kernel size, stride, and paddings.

After the model 1200 passes the (masked) image and mask through the encoder 1204, the model 1200 passes the masked image and mask (now smaller, but with higher dimensionality) through transpose convolution layers of a decoder 1206. The decoder 1206 includes the same number of layers (N) as the encoder 1204, and restores the image and mask to their original size/dimensions. Prior to each transpose layer of the decoder 1206, the model 1200 concatenates the image and mask from the previous layer (i.e., from the last convolution layer of the encoder 1204, or from the previous transpose layer of the decoder 1206) with the output of the corresponding convolution layer in the encoder 1204, as shown in FIG. 12.

The decoder 1206 outputs an output pair 1208, which includes the reconstructed (output) image and the corresponding mask. For training, as noted above, the original image serves as the target image against which module 124 compares the image of output pair 1208 at each iteration. Module 124 may train the model 1200 by attempting to minimize six losses:

Valid loss: The pixel loss in the region outside the mask. Module 124 may compute this loss by summing the pixel value difference between the input/original image and the output/reconstructed image.

Hole loss: The pixel loss in the masked region.

Perceptual loss: A higher-level feature loss, which module 124 may compute using a separately trained (pre-trained) VGG16 model. The VGG16 model may be pre-trained to classify samples with and without the relevant feature (e.g., defect). During training of the model 1200, module 124 may feed the original and reconstructed images into the pre-trained VGG16 model, and calculate perceptual loss by taking the difference of the three maximum pooling layers in the VGG16 model for the original and reconstructed images.

Style loss 1: Module 124 may compute this loss by taking the difference in Gram matrix value of the three maximum pooling layers in the VGG16 model for the original and reconstructed images (i.e., the same difference used for perceptual loss), to obtain a measure of total variation in higher-level image features.

Style loss 2: A loss similar to the valid loss, but for which module 124 uses a composite image (including the original image in the non-mask region and the reconstructed/output image in the mask region) to compute the loss, in place of the reconstructed/output image used for the valid loss.

Variation loss: A measure of the transition from the mask to the non-mask region of the reconstructed image.

In other implementations, more, fewer, and/or different loss types may be used to train the model 1200. At each iteration, depending on how well the model 1200 has reconstructed a particular input/original image (as measured based on the losses being minimized), module 124 may adjust values or parameters of the model 1200 (e.g., adjust convolution weights).

Figure 13:
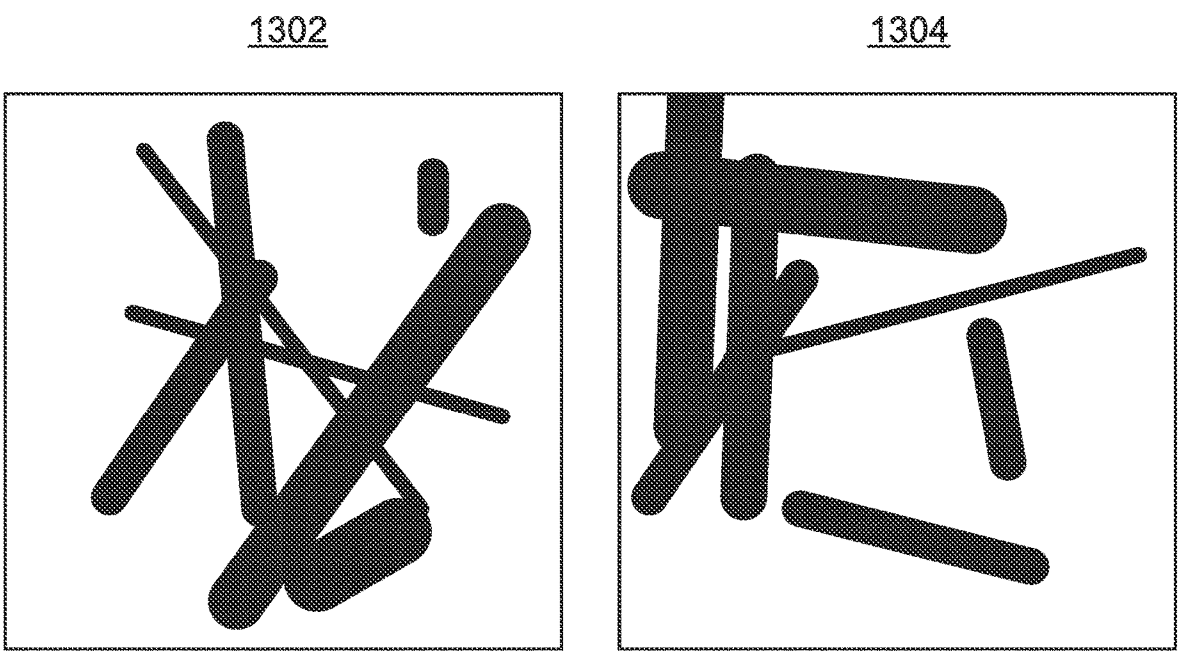
FIG. 13 depicts example masks that may be randomly generated for use in training a partial convolution model.

To generate synthetic "good" images from original (e.g., real) "defect" images, the model 1200 is extensively trained using good/non-defect images. In some implementations, module 124 randomly generates the masks used during training (e.g., the masks applied for different instances of input pair 1202). The masks may consist entirely of lines having different widths, lengths, and positions/orientations, for example. As a more specific example, module 124 may randomly generate masks each containing seven lines, with line width between 50 and 100 pts, for 256×256 images. FIG. 13 depicts two example masks 1302, 1304 of this sort that may be generated by module 124. Generally, masks with lines that are too narrow will require a very long training time, while masks with lines that are too wide will result in unrealistic inpainting. In other implementations, module 124 randomly generates masks using other shapes (e.g., rectangles, circles, a mix of shapes, etc.), and/or selects from a pre-designed set of masks.

Once the model 1200 is trained in this manner, module 124 can input defect images, with corresponding masks that obscure the defects, to the model 1200. FIG. 12 shows an example in which module 124 applies a defect image 1210 (showing a foreign object on a syringe plunger), and a mask 1212 that obscures the defect, as the input pair 1202 to the model 1200. The trained model 1200 then reconstructs the image 1210 as defect-free image 1214. Module 124 may then superimpose image 1214 on the portion of the full container image that corresponds to the original position of the input image 1210. In other implementations, module 124 may input images of entire containers (or other objects) to the model 1200, and the model 1200 may output reconstructed images of entire containers (or other objects).

Figure 14:
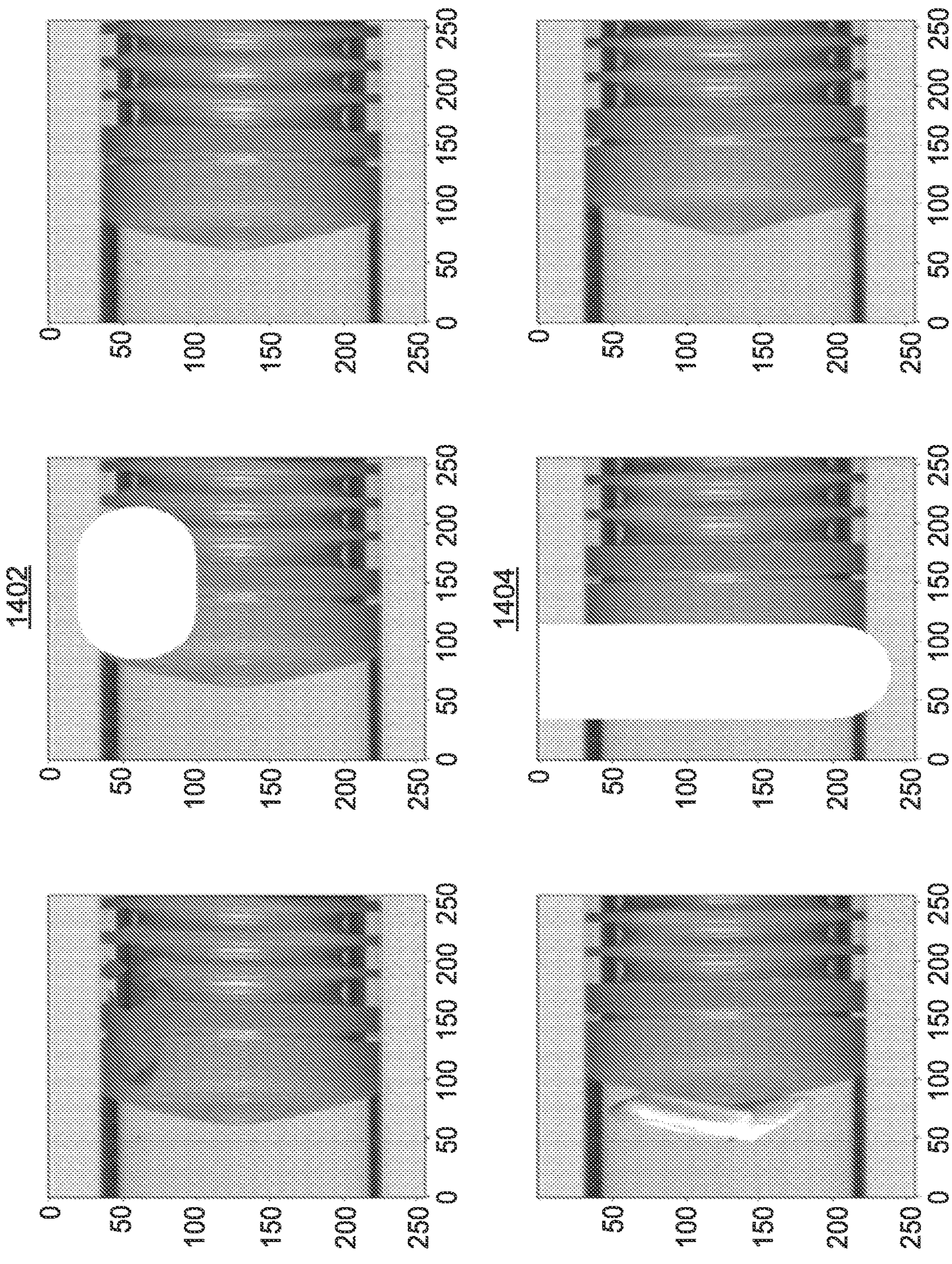
FIG. 14 depicts three example sequences in which a synthetic image is generated by digitally removing a defect from a real image using a partial convolution model.
Figure 14:
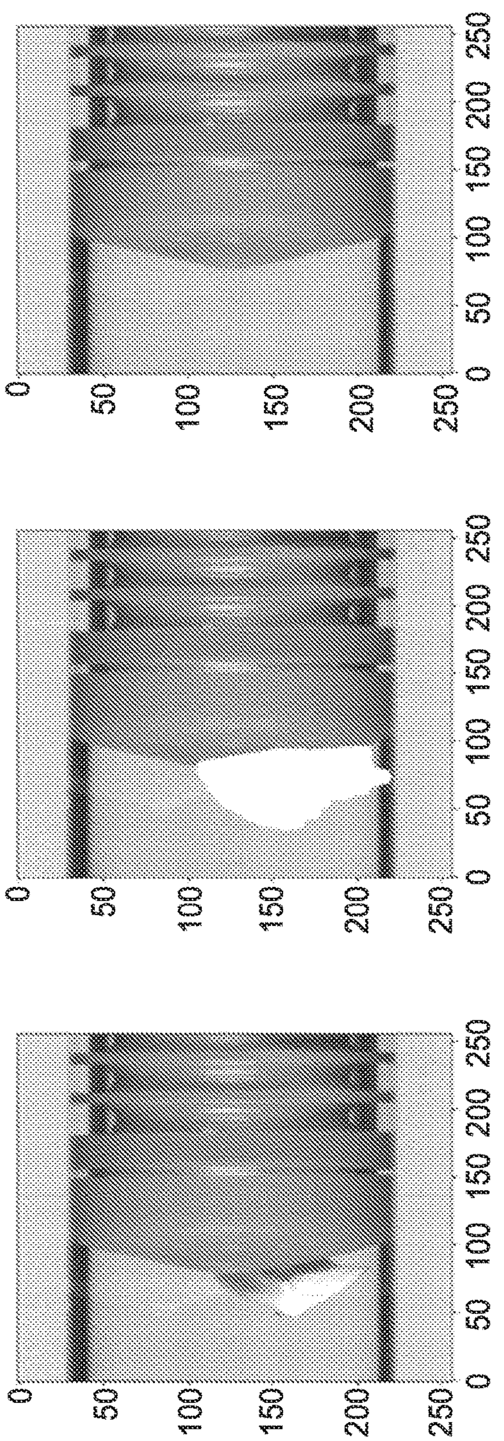

FIG. 14 depicts three example sequences 1402, 1404, 1406 in which a synthetic 256×256 image (right side of FIG. 14) is generated by digitally removing a defect from a real 256×256 image (left side of FIG. 14) using a partial convolution model similar to model 1200. As can be seen in the example sequences 1402, 1404, 1406, a mask is generated that can selectively obscure a defect on or near a syringe plunger. Specifically, a defect on the plunger itself is masked in sequence 1402, while foreign matter resting on the plunger is masked in sequences 1404 and 1406. The mask may be manually generated, or generated by module 124 using object detection techniques, for example. As seen in sequence 1406, the mask can be irregularly shaped (e.g., not symmetric about any axis).

Figure 15:
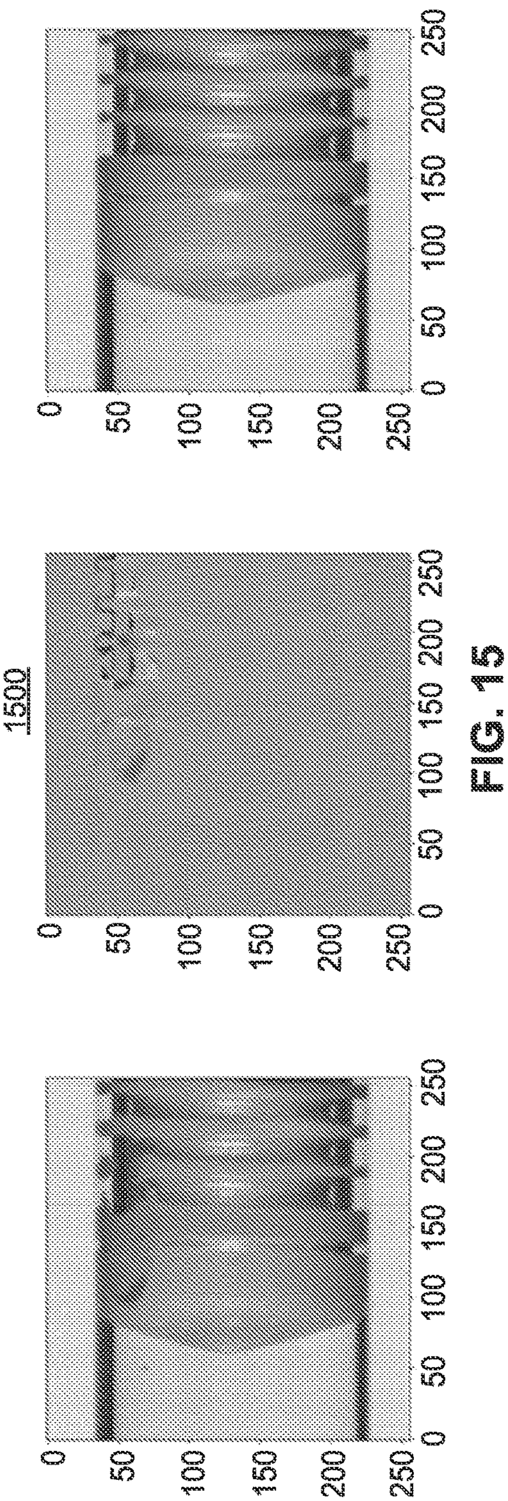
FIG. 15 depicts another example of a synthetic image generated by digitally removing a defect from a real image using a partial convolution model, with a difference image that illustrates how the real image was modified.

FIG. 15 depicts another example of a synthetic 256×256 image (right side of FIG. 15) generated by digitally removing a defect from a real 256×256 image (left side of FIG. 15) using a partial convolution model similar to model 1200, with a difference image (middle of FIG. 15) that illustrates how the real image was modified to arrive at the synthetic image. The difference image illustrates that, while the primary change from the real image was the removal of the plunger defect, some noise is also added to the real image. As noted above, this noise can help reduce overfilling of an AVI model (neural network) during training.

Figure 16:
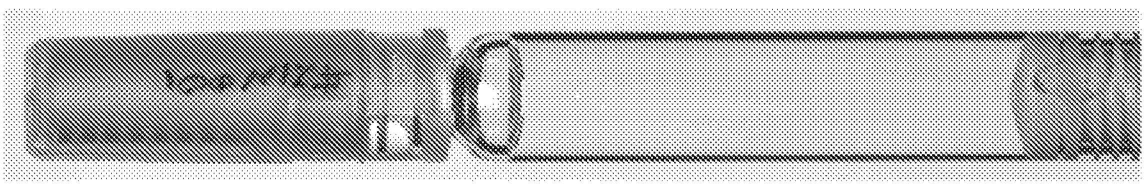
FIG. 16 depicts a real image of a defective syringe and a synthetic image of a defect-free syringe, where the synthetic image is generated based on the real image using a partial convolution model.
Figure 16:
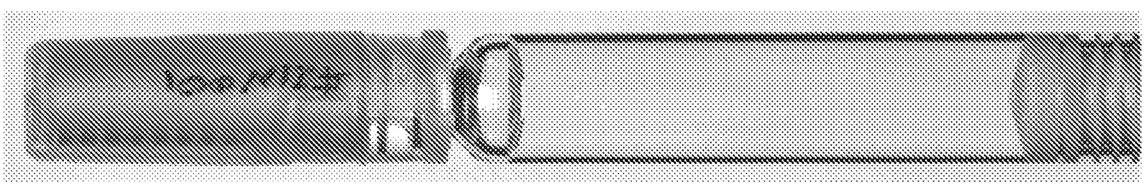

FIG. 16 depicts a real image 1600 of a syringe with a plunger defect, and a defect-free synthetic image 1602 generated using a partial convolution model similar to model 1200. In this example, the images 1600, 1602 are both 251×1651 images. For this particular example, the reconstruction was made more efficient by first cropping a square portion of the image 1600 that depicted the defect, and generating a mask for the smaller, cropped image. After reconstructing the cropped region using the partial convolution model, the reconstructed region was inserted back into the original image 1600 to obtain the synthetic image 1602. As seen in FIG. 16, the synthetic image 1602 provides a realistic portrayal of a defect-free syringe. Moreover, while not easily seen by the naked eye, the synthetic image 1602 contains added noise that can aid the training process as discussed above. In this case, however, the added noise is not distributed throughout the entire image 1602 due to the cropping technique used. In some implementations, one or more post-processing techniques may be used to ensure a more realistic transition between the reconstructed region and the surrounding regions, and/or to remove or minimize any artifacts. For example, after generating the synthetic image 1602 by inserting the reconstructed region back into the original image 1600, module 124 may add noise that is distributed through the entire image 1602, and/or perform smoothing on the image 1602.

Figure 17:
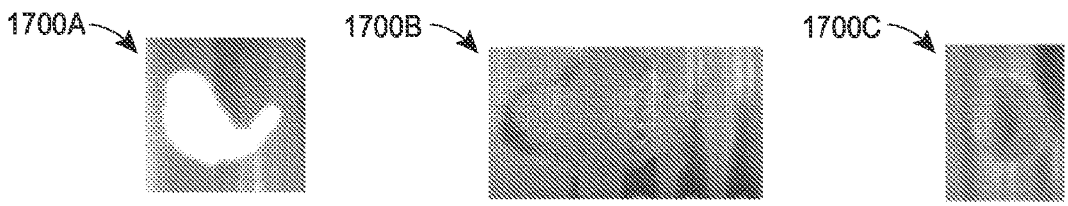
FIG. 17 depicts three example defect images that may be used, along with a partial convolution model, to digitally add defects to syringe images according to a first technique.

In some implementations, module 124 also, or instead, uses deep learning-based inpainting (e.g., a partial convolution model similar to model 1200) in the reverse direction, to generate synthetic "defect" images from original "good" images. In a first implementation, this can be accomplished by training a partial convolution model (e.g., model 1200) in the same manner described above for the case of adding defects (e.g., using good images for the input pair 1202)). To add a defect, however, a different image is input to the trained partial convolution model. Specifically, instead of inputting a "good" image, module 124 first adds an image of the desired defect to the good image at the desired location. This step can use simple image processing techniques, such as simply replacing a portion of the good image with an image of the desired defect. Module 124 may retrieve the defect image from feature image library 142, for example. FIG. 17 depicts three example defect images 1700A through 1700C that may be included in feature image library 142, any one of which may be used to replace the portion of the original image. Any other suitable defect types may instead be used (e.g., any of the defect types discussed above in connection with feature image library 142 of FIG. 1, or defects associated with other contexts such as automotive bodywork inspection, etc.).

In some implementations, after the defect image is placed at the desired location (e.g. with inputs from a user of a software tool via a graphical user interface, or entirely by module 124), module 124 automatically creates a mask by setting the occluded area to have the same size and position within the original image as the superimposed defect image. Module 124 may then input the modified original image (with the superimposed defect image) and the mask as separate inputs to the partial convolution model (e.g., model 1200).

Figure 18:
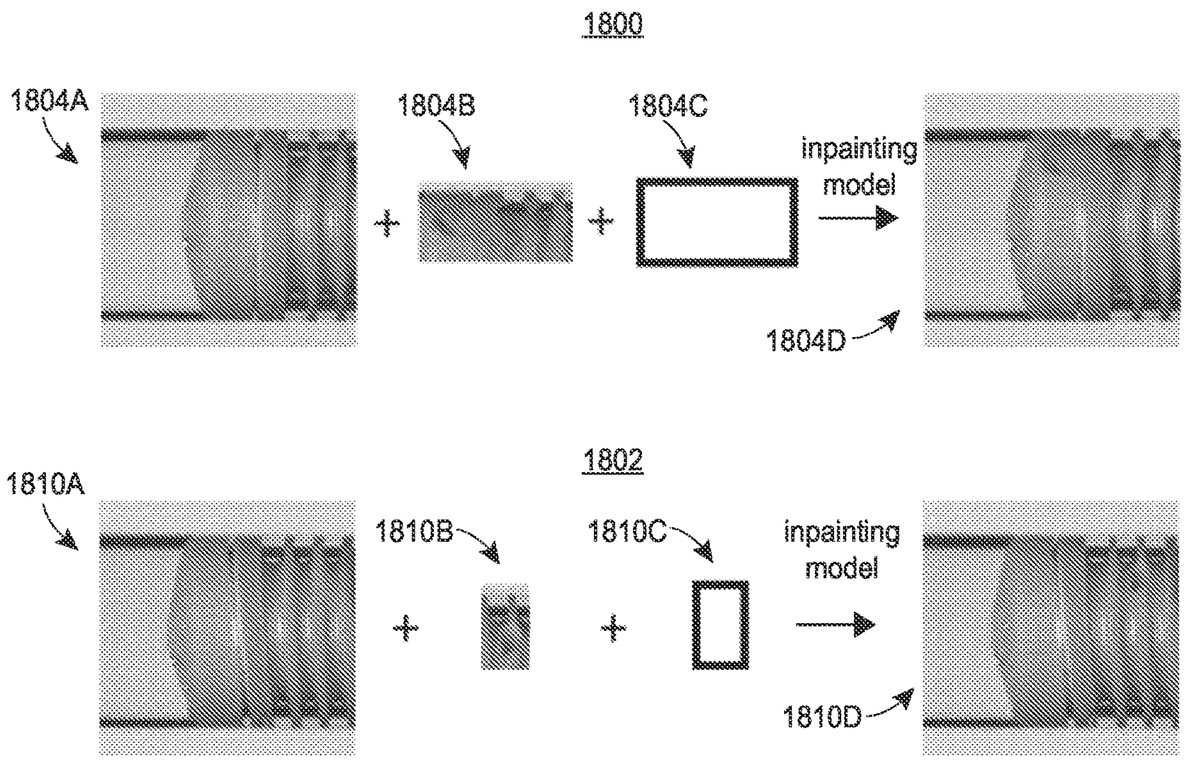
FIG. 18 depicts two example sequences in which a partial convolution model is used to add a defect to a syringe image, according to the first technique.
Figure 19:
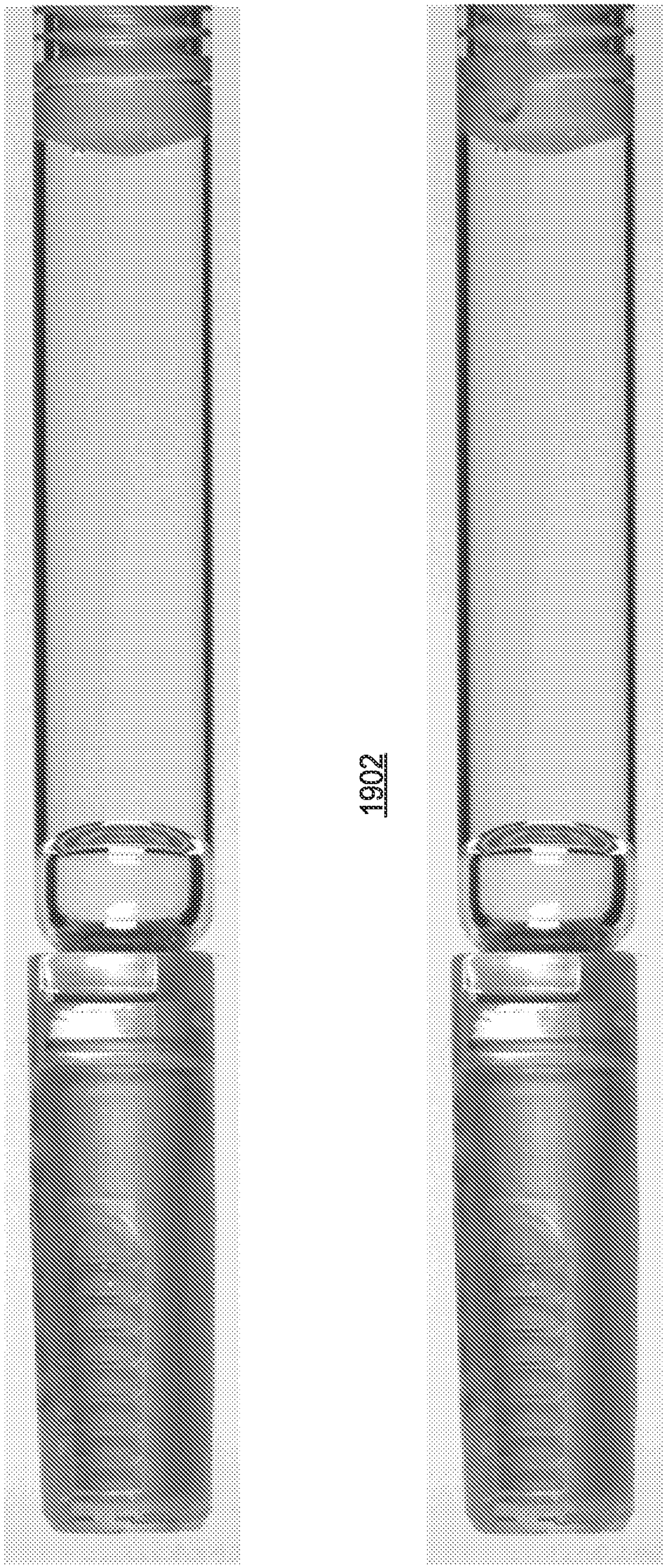
FIG. 19 depicts a real image of a defect-free syringe and a synthetic image of a defective syringe, where the synthetic image is generated based on the real image using a partial convolution model and the first technique.

FIG. 18 depicts two example sequences 1800, 1802 in which this technique is used to add a defect to a 256×256 partial syringe image. In the sequence 1800, module 124 retrieves a real image 1804A, superimposes a desired defect image 1804B at the selected (e.g., manually or randomly determined) location or predetermined location, generates a mask 1804C that matches the size of the real image 1804A but has an occluded area matching the size and position of the superimposed defect image 1804B, and then applies the modified real image and mask 1804C as separate inputs to the partial convolution model (e.g., model 1200) to generate the synthetic image 1804D. Similarly, in sequence 1802, module 124 retrieves a real image 1810A, superimposes a desired defect image 1810B at the selected (e.g., manually or randomly determined) location or predetermined location, generates a mask 1810C that matches the size of the real image 1810A but has an occluded area matching the size and position of the superimposed defect image 1810B, and then applies the modified real image and mask 1810C as separate inputs to the partial convolution model (e.g., model 1200) to generate the synthetic image 1810D. Mask linewidths of 16 pts were used to generate the synthetic images 1804D, 1810D. As seen in FIG. 18, this technique inpaints the masked region with the applied defect, and provides a smooth transition region with a realistic appearance. Another example is shown in FIG. 19, where this same technique was used to augment a real 251×1651 image 1900, to obtain the synthetic defect image 1902.

In other implementations, module 124 uses a partial convolution model such as model 1200 to add defects to original images, but trains the model in a different manner, to support random defect generation. In this implementation, during training, module 124 feeds each defect image (e.g., a real defect image) to the partial convolution model, to serve as the target image. The training sample is the same defect image, but with a mask that (when applied to the defect image) masks the defect. By repeating this for numerous defect images, module 124 trains the partial convolution model to inpaint each mask/hole region with a defect. Once the partial convolution model is trained, module 124 can apply the good/non-defect images, along with masks at the desired defect locations, as input pairs.

Figure 20:
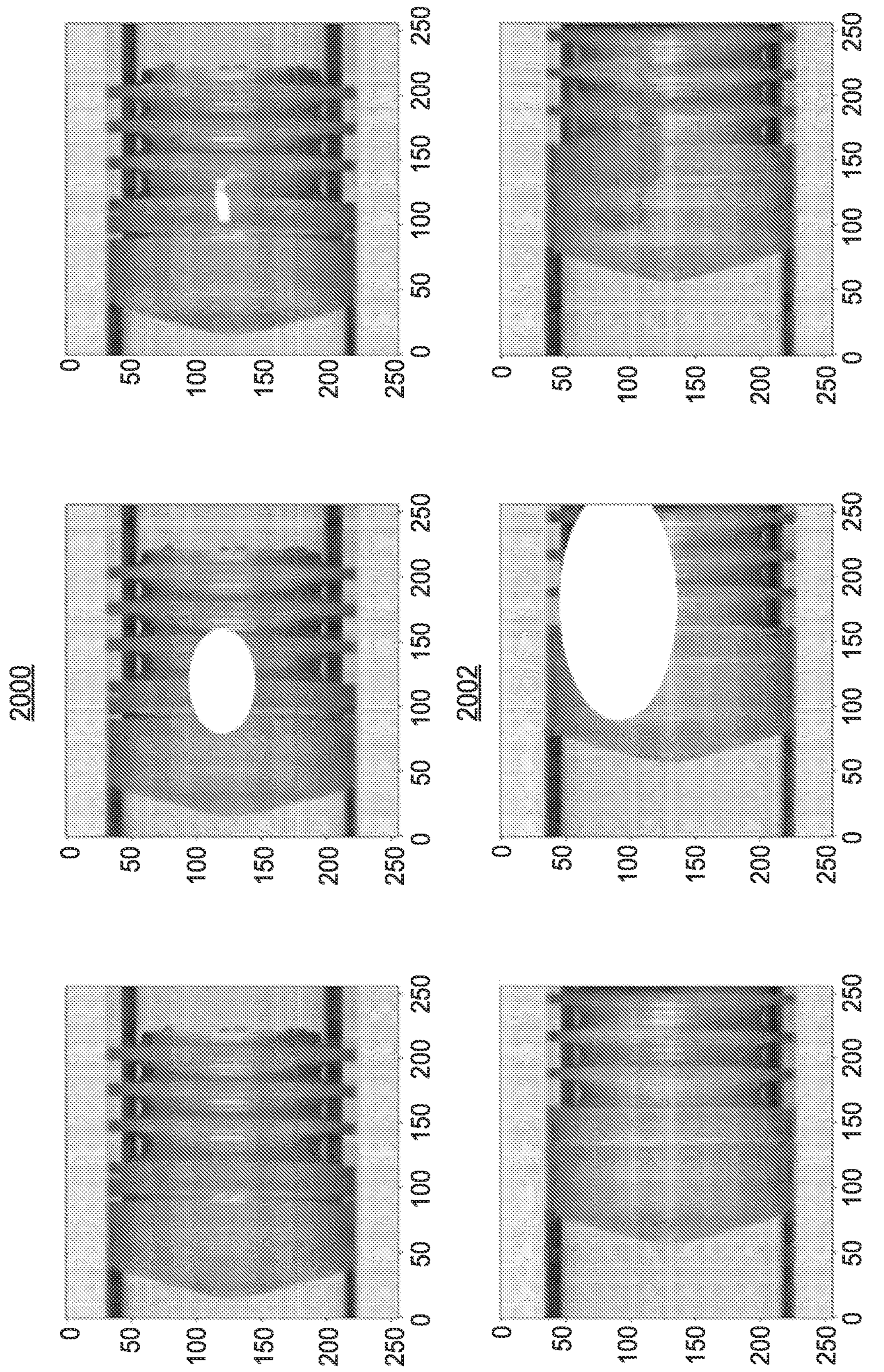
FIG. 20 depicts three example sequences in which a partial convolution model is used to add a defect to a syringe image, according to a second technique.
Figure 20:
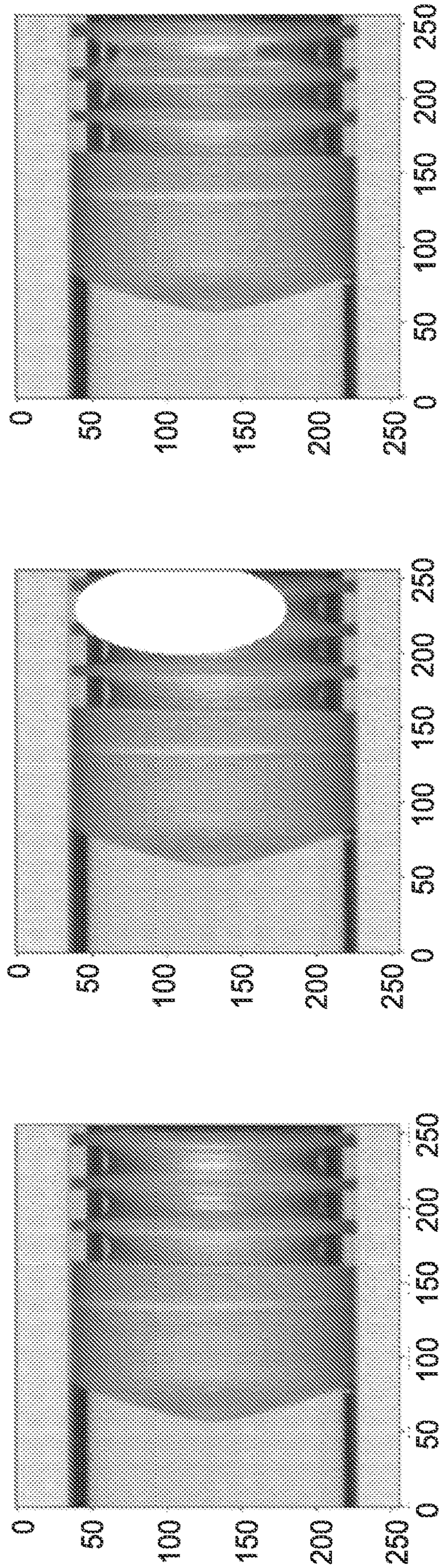
Figure 21:
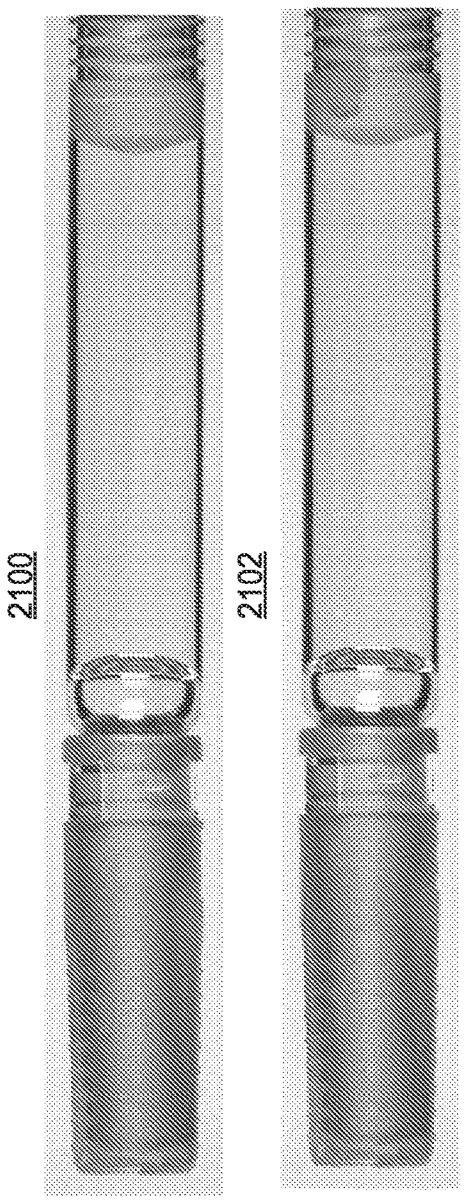
FIG. 21 depicts a real image of a defect-free syringe and a synthetic image of a defective syringe, where the synthetic image is generated based on the real image using a partial convolution model and the second technique.

In these implementations, if multiple defect types are desired, it can be advantageous to train separate partial convolution models for different defect types. For example, module 124 may train a first partial convolution model to augment good images by adding a speck, and a second partial convolution model to augment images by adding malformed plunger ribs, etc. This generally provides more control over defect inpainting, and allows the different models to be trained independently (e.g., with different hyperparameters to account for the different complexities associated with each defect type). This can also generate defects that are more "pure" (i.e., distinctly within a single defect class), which can be helpful, for example, if the synthesized images are to be used to train a computer vision system that identifies different defect classes. FIG. 20 depicts three example sequences 2000, 2002, 2004 in which this technique was used to add a defect to a syringe image. In each sequence, module 124 retrieves a real image (left side of FIG. 20), generates a mask that occludes a portion of the real image at which a defect is to be added (middle of FIG. 20), and applies the real image and the mask as separate inputs to the trained partial convolution model (similar to model 1200) to generate the synthetic image (right side of FIG. 20). Another example is shown in FIG. 21, where this same technique was used to augment a real 251×1651 image 2100, to obtain the synthetic defect image 2102.

Figure 22:
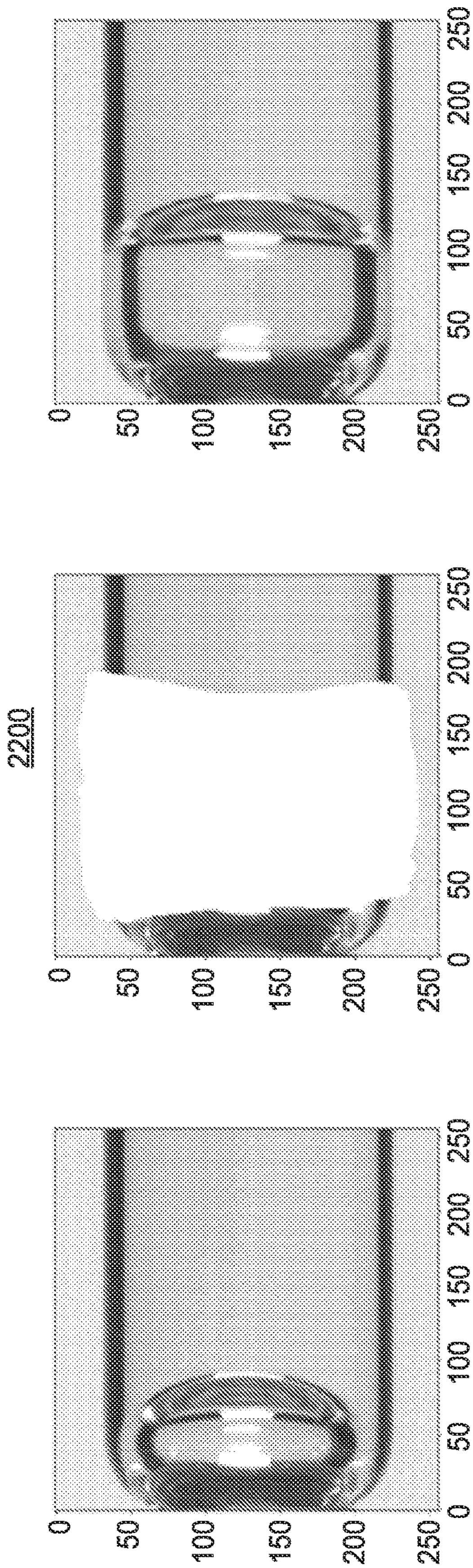
FIG. 22 depicts an example sequence in which a partial convolution model is used to modify a meniscus in a syringe image, according to the second technique.
Figure 23:
FIG. 23 depicts a real image of a syringe and a synthetic image in which the meniscus has been digitally altered, where the synthetic image is generated based on the real image using a partial convolution model and the second technique.

In some implementations, module 124 also, or instead, uses deep learning-based inpainting (e.g., a partial convolution model similar to model 1200) to modify (e.g., move and/or change the appearance of) a feature that is depicted in original (e.g., real) images. For example, module 124 may move and/or change the appearance of a meniscus (e.g., in a syringe). In these implementations, module 124 may use either of the two techniques that were described above in the context of adding a defect using a partial convolution model (e.g., model 1200): (1) training the model using "good" images as the target images, and then superimposing original images with feature images (e.g., from feature image library 142) depicting the desired feature appearance/position to generate synthetic images; or (2) training the model using images that exhibit the desired feature appearance/position (with corresponding masks that obscure the feature), and then masking original images at the desired feature locations to generate synthetic images. An example sequence 2200 for generating a synthetic image using the latter of these two alternatives is shown in FIG. 22. As seen in FIG. 22, the mask, which can be irregularly shaped, should occlude both the portion of the original image that depicted the relevant feature (here, the meniscus), and the portion of the original image to which the feature will be transposed. Another example is shown in FIG. 23, where this same technique was used to augment a real 251×1651 image 2300, to obtain the synthetic image 2302 (specifically, by moving the meniscus to a new location, and "reshaping" the meniscus). Similar to the reconstruction shown in FIG. 16, the reconstruction was made more efficient by first cropping a square portion of the image 2300 that depicted the meniscus, and then generating a mask for the smaller, cropped image. After reconstructing the cropped region using the partial convolution model, the reconstructed region was inserted back into the original image 2300 to obtain the synthetic image 2302.

Module 124 may also, or instead, use this technique to move/alter other features, such as the plunger (by digitally moving the plunger along the barrel), lyophilized vial contents (e.g., by digitally altering the fill level of the vial), and so on. In implementations where the partial convolution model is trained using target images that depict the desired feature position/appearance (i.e., the latter of the two techniques discussed above), module 124 may train and use a different model for each feature type. For a given partial convolution model, the range and variation of the feature (e.g., meniscus) that the model artificially generates can be tuned by controlling the variation among the training samples. Generally, augmenting a feature such as the meniscus to a standard state can help the training of an AVI classification model by preventing the variations in the feature (e.g., different meniscus positions) from "distracting" the classifier, which in turn helps the classifier focus only on defects.

Inpainting using a partial convolution model can be highly efficient. For meniscus augmentation, for example, thousands of images can be generated in a few minutes using a single base mask, depending on the available processing power (e.g., for processing unit 110). Defect generation can be similarly efficient. For defect removal, in which a mask is drawn for each image to cover the defect (which can take about one second per image), the output can be slower (e.g., in the thousands of images per hour, depending on how quickly each mask can be created). However, all of these processes are much faster and lower cost than manual creation and removal of defects in real samples.

In some implementations, processing power constraints may limit the size of the images to be augmented (e.g., images of roughly 512×512 pixels or smaller), which can in turn make it necessary to crop images prior to augmentation, and then re-insert the augmented image crop. This takes extra time, and can have other undesired consequences (e.g., for the deep learning-based inpainting techniques, failing to achieve the benefits of adding slight noise/variation to the entire image rather than just the smaller/cropped portion, as noted above in connection with FIG. 16). In some implementations, module 124 addresses this by using a ResNet feature extractor rather than a VGG feature extractor. Feature extractors such as these are used to calculate the losses that are used to tune the weights of the inpainting model during training. The module 124 may use any suitable version of a ResNet feature extractor (e.g., ResNet50, ResNet101, ResNet152, etc.), depending on the image dimensions and the desired training speed.

Moreover, in some implementations, module 124 may apply post-processing to synthetic images in order to reduce undesired artifacts. For example, module 124 may add noise to each synthetic image, perform filtering/smoothing on each synthetic image, and/or perform Fast Fourier Transform (FFT) frequency spectrum analysis and manipulation on each synthetic image. Such techniques may help to mitigate any artifacts, and generally make the images more realistic. As another example, module 124 may pass each synthetic image through a refiner, where the refiner was trained by pairing the refiner with a discriminator. During training, both the refiner and the discriminator are fed synthetic and real images (e.g., by module 124). The goal of the discriminator is to discriminate between a real and synthetic image, while the goal of the refiner is to refine the synthetic image to a point where the discriminator can no longer distinguish the synthetic image from a real image. The refiner and discriminator are thus adversaries of each other, and work in a manner similar to a generative adversarial network (GAN). After multiple cycles of training, the refiner can become very adept at refining images, and therefore module 124 can use the trained refiner to remove artifacts from synthetic images that are to be added to the training image library 140. Any of the techniques described above can also be used to process/refine synthetic images that were generated without deep learning techniques, such as synthetic images generated using the algorithm 400 discussed above.

Various tests were performed to show that the generation of complementary synthetic images from original images (e.g., synthetic "defect" images for real "good" images, or synthetic "good" images for real "defect" images) can substantially improve the training of an AVI deep learning model (e.g., image classifier), and guide the AVI model to precisely locate defects. In one such test, a ResNet50 defect classifier for syringes was trained on two sets of training samples. The first training sample set consisted of 270 original images with defects and 270 original images without defects. In the second training sample set, non-defect samples consisted of 270 original images and 270 synthetic images (generated from the originally defective samples, where the defects were removed using the inpainting tool), while defect samples consisted of 270 original images (which were used to generate the synthetic non-defect images) and 270 synthetic images (which were generated from the 270 original defect images, and generated using the inpainting tool with no masks). The testing samples in both cases were 60 original images with a mix of defects and no defects. Notably, the testing samples were not independent of the training samples, because the former were images from the same syringes as the latter, and differed only by rotation.

Below is a table summarizing the details of these training sample sets, which were used to train two different AVI image classification models ("Classifier 1" and "Classifier 2"):

| Classifier 1 | |
|---|---|
| NON-DEFECTS | DEFECTS |
| 270 original images | 270 original images |

| Classifier 2 | |
|---|---|
| NON-DEFECTS | DEFECTS |
| 270 original images (A)<br>270 synthetic images (C)<br>[generated from (B)] | 270 original images (B)<br>270 synthetic images (D)<br>[generated from (B)] |

Figure 24A:
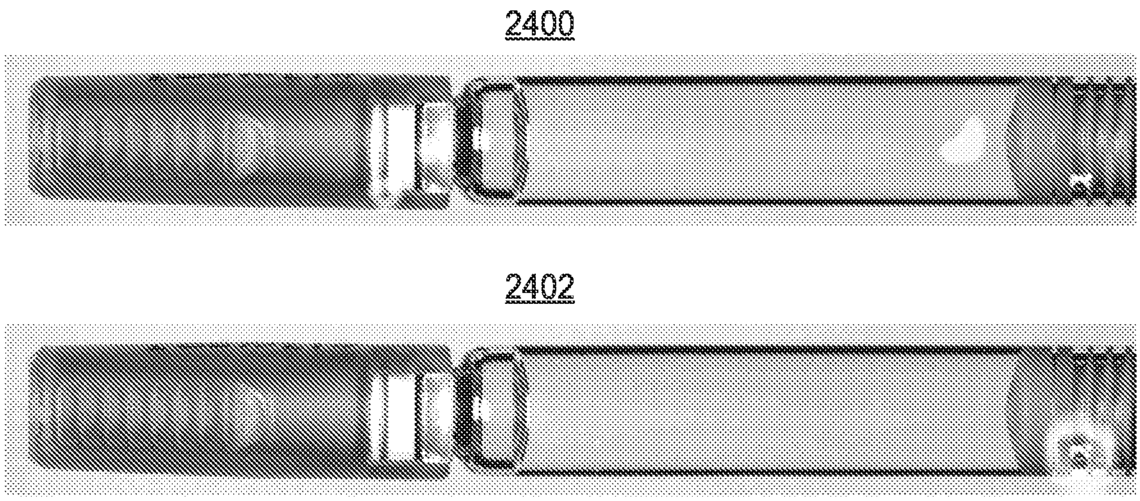
FIGS. 24A and 24B depict example heatmaps indicative of the causality underlying predictions made by AVI deep learning models trained with and without synthetic training images.
Figure 24B:
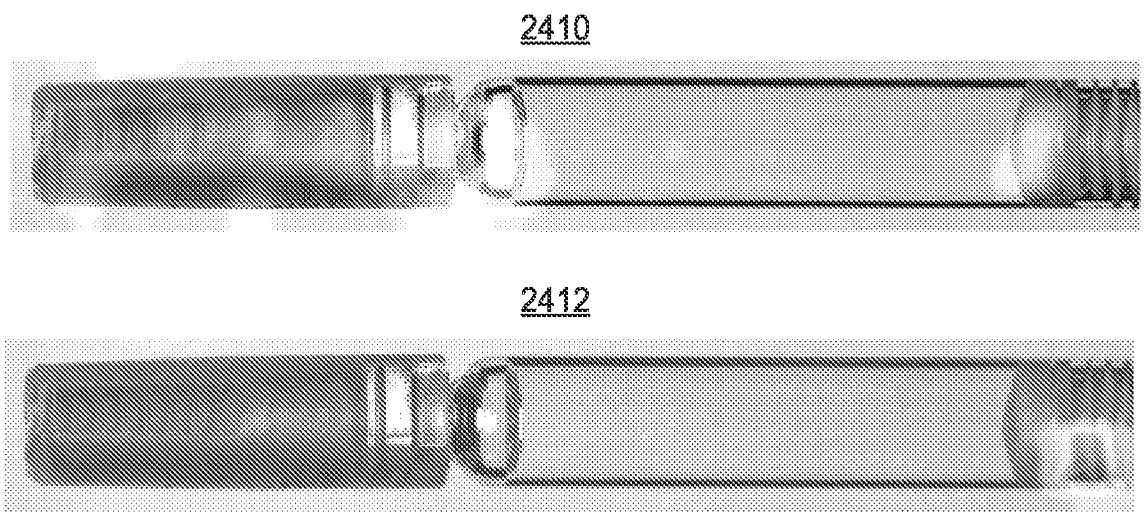

Classifier 1 and Classifier 2 were each trained for eight epochs using an Adam optimizer with a learning rate of 0.0001. FIG. 24A shows Grad-CAM images 2400, 2402 generated using Classifier 1 and Classifier 2, respectively, for a black-and-white stain defect. While both Classifier 1 and Classifier 2 provided 100% accuracy for the test samples used, it can be seen from FIG. 24A that Classifier 2 provided a drastic improvement over Classifier 1. Specifically, Classifier 2 focused on the correct region of the sample image (the plunger ribs), while Classifier 1 instead focused on the area of the meniscus, where no defect was present. Moreover, Classifier 1 only provided the correct classification ("defect") because, as noted above, the image was related by rotation to the samples that the classifier had already seen during training. Another example is shown in FIG. 24B, showing Grad-CAM images 2410, 2412 generated using Classifier 1 and Classifier 2, respectively, for a speck defect. Again, Classifier 2 focused on the correct region, while Classifier 1 focused on the wrong region. This was also the case for three other defect classes that were tested. Thus, inclusion of 50% synthetic images in the training sample set drastically improved classifier performance in all cases tested.

To ensure proper training of the AVI model (e.g., image classification model), it is prudent to include quality control measures at one or more stages. This can be particularly important in the pharmaceutical context, where it is necessary to protect patient safety by ensuring a safe and reliable drug product. In some implementations, both "pre-processing" and "post-processing" quality checks are performed (e.g., by image/library assessment module 126). Generally, these pre- and post-processing quality checks may leverage various image processing techniques to analyze and/or compare information on a per-pixel basis.

Because images are typically captured under tightly controlled conditions, there are often only subtle differences between any two images from the same dataset. While it can be labor-intensive to measure variability in image parameters across an entire dataset, the ability to quickly and visually assess such variability can save time (e.g., by avoiding measurements of the wrong attributes), and can serve as an initial quality check on image capture conditions. Knowing this variability can be useful for two reasons. First, variability in certain attributes (e.g., plunger position) can overwhelm the signal from the actual defect and thus lead to misclassifications, as the algorithm might weigh the variable attribute more heavily than the defect itself. Second, for the purpose of image augmentation, it can be useful to know the range of variability in given attributes, in order to constrain those attributes to that range when creating population-representative synthetic images.

Figure 25:
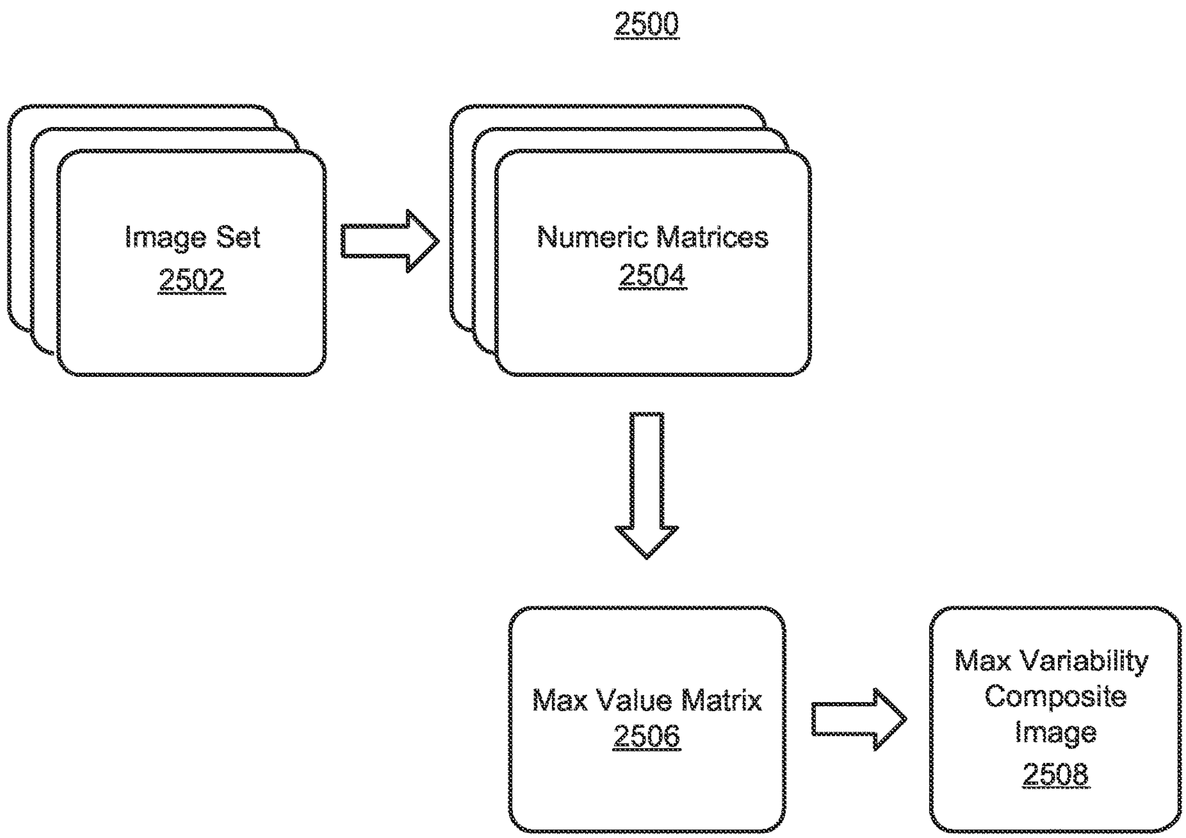
FIG. 25 depicts an example process for generating a visualization that can be used to evaluate diversity in a set of images.

FIG. 25 depicts an example process 2500 for generating a visualization that can be used to quickly evaluate diversity in a set of images. The process 2500 may be executed by image/library assessment module 126 (also referred to as simply "module 126"). In the process 2500, module 126 converts an image set 2502 into a set of respective numeric matrices 2504, each having exactly one matrix element for each pixel in the corresponding image from image set 2502. Module 126 then determines the maximum value across all of the numeric matrices 2504 at each matrix location (i,j), and uses the maximum value to populate the corresponding position (i,j) in a max value matrix 2506. Module 126 then converts the max value matrix 2506 to a max variability composite (bitmap) image 2508. Alternatively, module 126 may avoid creating a new max value matrix 2506, and instead update a particular numeric matrix from the set 2504 (e.g., by successively comparing each element value for that numeric matrix to the corresponding element value for all other numeric matrices 2504, and updating whenever a larger value is found).

Figure 26A:
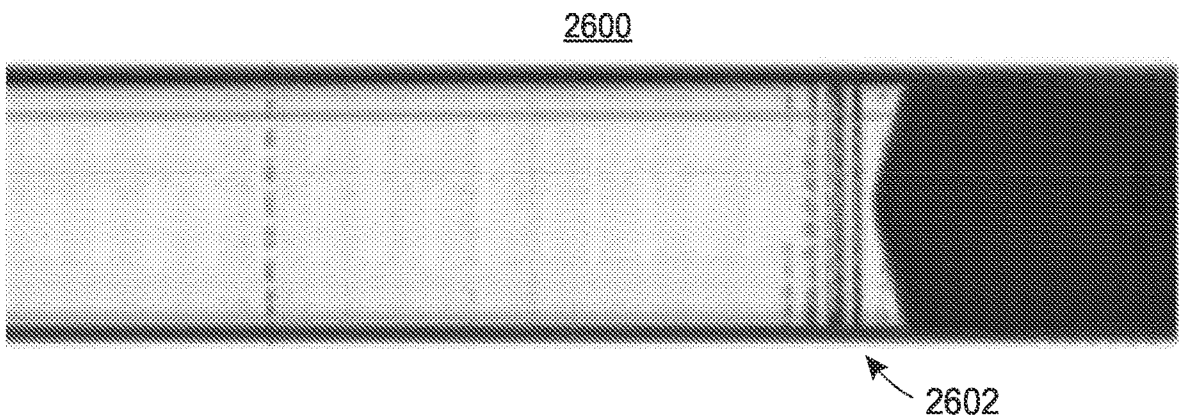
FIG. 26A depicts an example visualization generated by the process of FIG. 25.

Computer system 104 may then present the resulting composite image 2508 on a display, to allow rapid visualization of dataset variability. FIG. 26A depicts one such example visualization 2600. In this example, it can be seen that the plunger moves as far left as point 2602. This may or may not be acceptable, depending upon the desired constraints. Module 124 may then use point 2602 as a leftmost bound on the plunger (e.g., when creating synthetic images with different plunger positions), for example. In some implementations, module 124 determines this bound more precisely by determining the point (e.g., pixel position) where the first derivative across successive columns exceeds some threshold value.

Figure 26B:
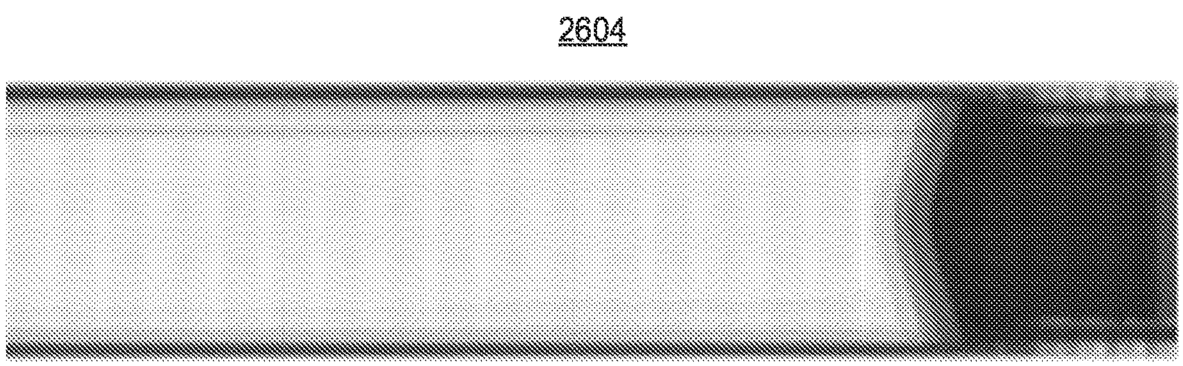
FIG. 26B depicts an example visualization that may be used to evaluate diversity in a set of images using another process.

Other variations of the visualization 2600 are also possible. For example, module 126 may determine the minimum image (i.e., take the minimum element value at each matrix position across all numeric matrices 2504), or the average image (i.e., take the average value at each matrix position across all numeric matrices 2504), etc. An example average image visualization 2604 is shown in FIG. 26B. In any of these implementations, this technique can be used to display variability as a quality check, and/or to determine the attribute/feature bounds to which synthetic images must adhere.

Figure 27:
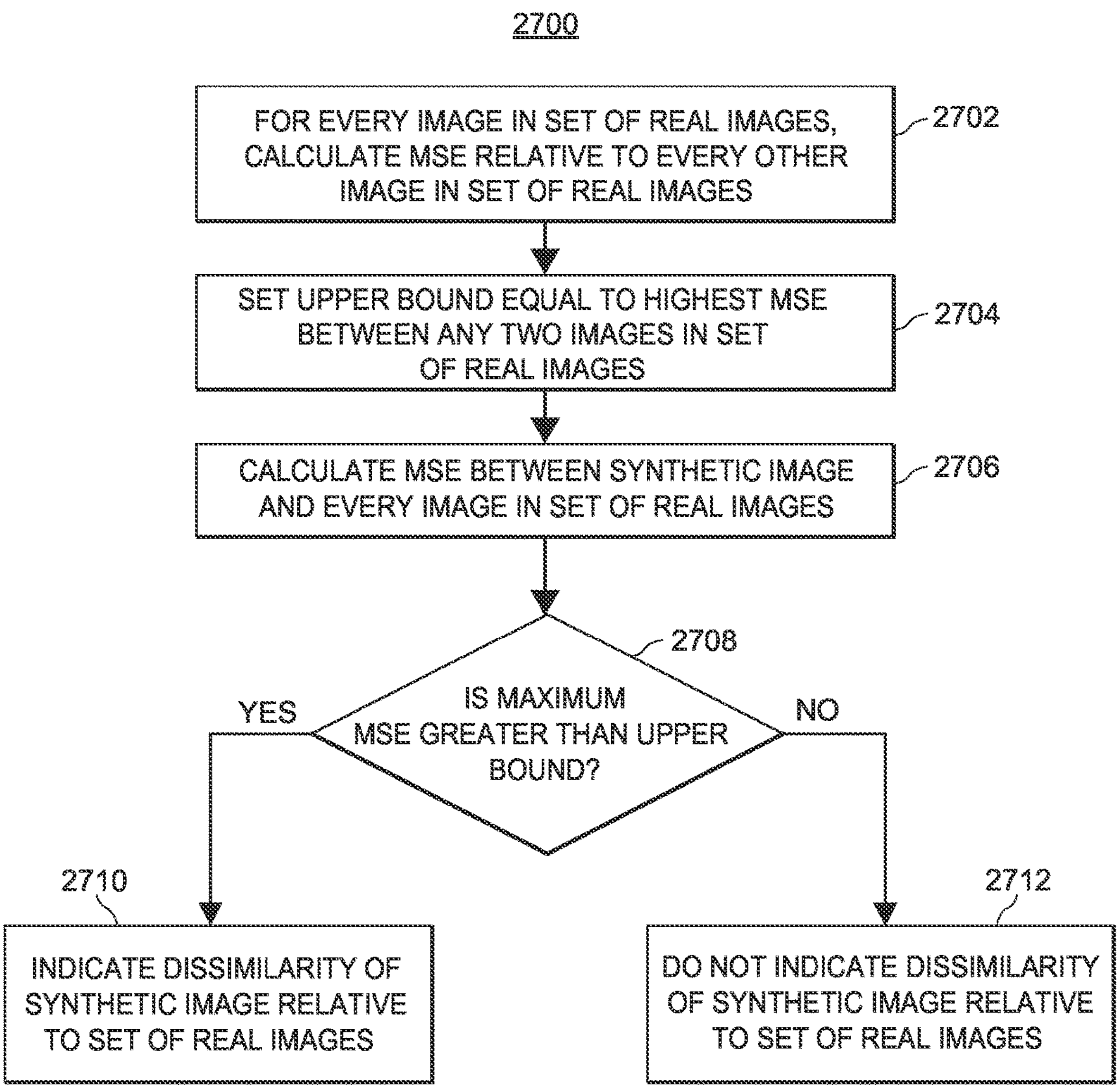
FIG. 27 depicts an example process for assessing similarity between a synthetic image and an image set.

FIG. 27 depicts an example process 2700 for assessing similarity between a synthetic image and an image set. The process 2700 may be executed by image/library assessment module 126, to assess synthetic images generated by library expansion module 124, for example. Module 126 may use the process 2700 in addition to one or more other techniques (e.g., assessing AVI model performance before and after synthesized images are added to the training set). The process 2700, however, is used in a more targeted way to assure that each synthetic image is not radically different than the original, real images.

At block 2702 of the process 2700, for every image in a set of real images, module 126 calculates a mean squared error (MSE) relative to every other image in the set of real images. The MSE between any two images is the average of the squared difference in the pixel values (e.g., in the corresponding matrix element values) at every position. For i×j images, for example, the MSE is the sum of the squared difference across all i×j pixel/element locations, divided by the quantity i×j. Thus, module 126 calculates an MSE for every possible image pair in the set of real images. The set of real images may include all available real images, or a subset of a larger set of real images.

At block 2704, module 126 determines the highest MSE from among all the MSEs calculated at block 2702, and sets an upper bound equal to that highest MSE. This upper bound can serve as a maximum permissible amount of dissimilarity between a synthetic image and the real image set, for example. The lower bound is necessarily zero.

At block 2706, module 126 calculates an MSE between a synthetic image under consideration and every image in the set of real images. Thereafter, at block 2708, module 126 determines whether the largest of the MSEs calculated at block 2706 is greater than the upper bound set at block 2704. If so, then at block 2710 module 126 generates an indication of dissimilarity of the synthetic image relative to the set of real images. For example, module 126 may cause the display of an indicator that the upper bound was exceeded, or generate a flag indicating that the synthetic image should not be added to training image library 140, etc. If the largest of the MSEs calculated at block 2706 is not greater than the upper bound set at block 2704, then at block 2712 module 126 does not generate the indication of dissimilarity. For example, module 126 may cause the display of an indicator that the upper bound was not exceeded, or generate a flag indicating that the synthetic image should, or may, be added to training image library 140, etc.

Figure 28:
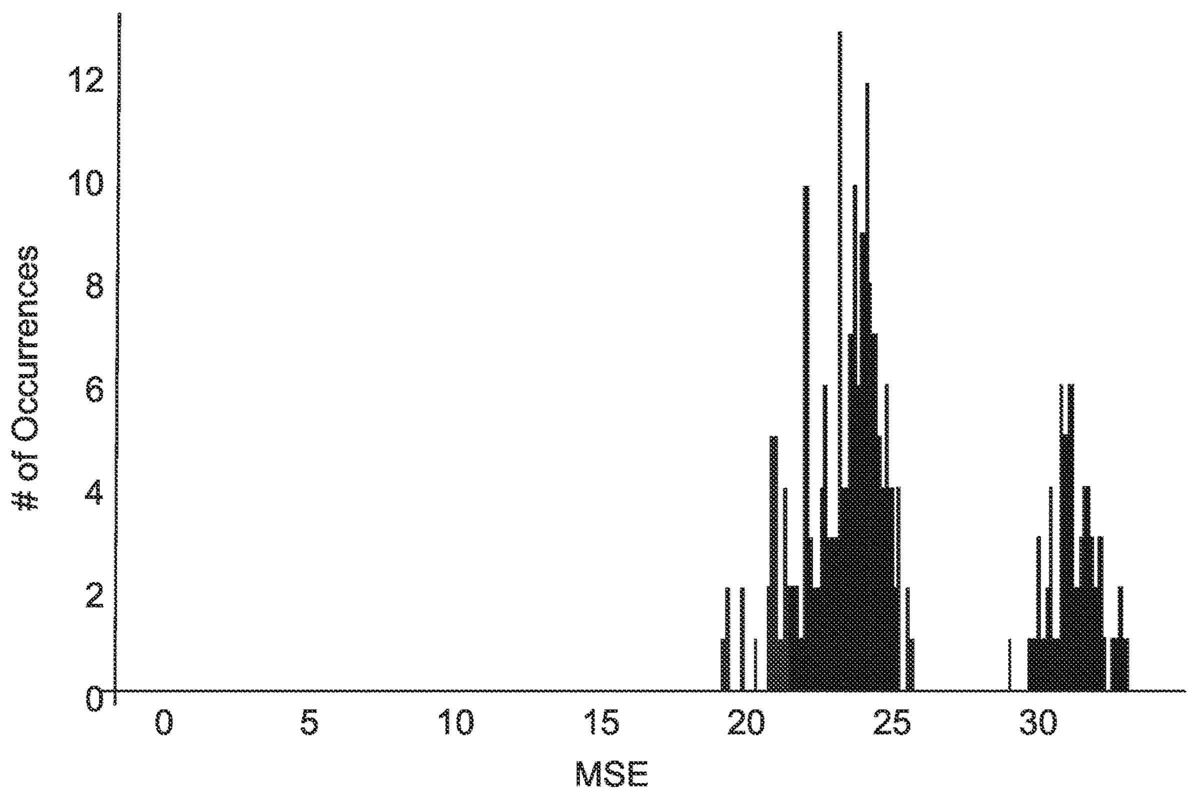
FIG. 28 is an example histogram generated using the process of FIG. 27.

In some implementations, the process 2700 varies in one or more respects from what is shown in FIG. 27. For example, at block 2708 module 126 may instead determine whether the average of all the MSEs calculated at block 2706 exceeds the upper bound. As another example, in some implementations, module 126 generates a histogram of the MSEs calculated at block 2706, instead of (or in addition to) performing blocks 2708, 2710 or blocks 2708, 2712. An example of one such histogram 2800 is shown in FIG. 28. The x-axis of the example histogram 2800 shows the MSE, while the y-axis shows the number of times that the MSE occurred during the synthetic and real image comparisons. While there are some inherent limitations with using MSE as a quality proxy, the metric can provide a reasonable approach that supplements an analysis of AVI model performance.

In some implementations, in addition to or instead of the techniques discussed above (e.g., the process 2700), computer system 104 determines one or more other image quality metrics (e.g., to determine the similarity between a given synthetic image and other images, or to measure diversity of an image set, etc.). For example, computer system 104 may use any of the techniques described in U.S. Provisional Patent Application No. 63/020,232 for this purpose.

Figure 29:
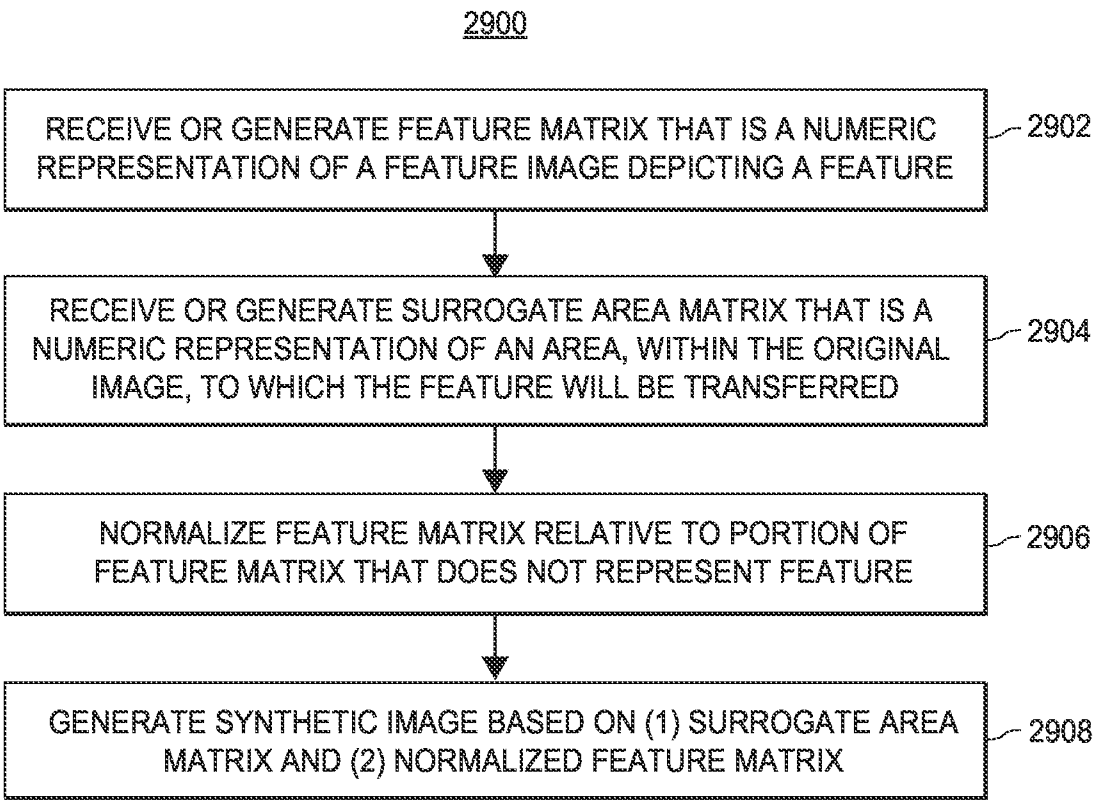
FIG. 29 is a flow diagram of an example method for generating a synthetic image by transferring a feature onto an original image.

FIGS. 29 through 32 depict flow diagrams of example methods corresponding to various techniques described above. Referring first to FIG. 29, a method 2900 for generating a synthetic image by transferring a feature onto an original image may be executed by module 124 of FIG. 1 (e.g., when processing unit 110 executes instructions of module 124 stored in memory unit 114), for example.

At block 2902, a feature matrix is received or generated. The feature matrix is a numeric representation of a feature image depicting a feature. The feature may be a defect associated with a container (e.g., syringe, vial, cartridge, etc.) or contents of a container (e.g., a fluid or lyophilized drug product), for example, such as a crack, chip, stain, foreign object, and so on. Alternatively, the feature may be a defect associated with another object (e.g., scratches or dents in the body of an automobile, dents or crack in house siding, cracks, bubbles, or impurities in glass windows, etc.). Block 2902 may include performing the defect image conversion of block 404 in FIG. 4A, for example. In some embodiments, block 2902 includes rotating and/or resizing the feature matrix, or rotating and/or resizing an image from which the feature matrix is derived (e.g., as discussed above in connection with FIG. 4A for the more specific case where the "feature" is a defect). If the feature image is rotated and/or resized, this step occurs prior to generating the feature matrix to ensure that the feature matrix reflects the rotation. Where block 2902 includes rotating the feature matrix or feature image, the method 2900 may include rotating the feature matrix or feature image by an amount that is based on both (1) a rotation of the feature depicted in the feature image, and (2) a desired rotation of the feature depicted in the feature image. The method 2900 may include determining this "desired" rotation based on a position of the area to which the feature will be transferred, for example. Block 2902 may also, or instead, include resizing the feature matrix or the feature image.

At block 2904, a surrogate area matrix is received or generated. The surrogate area matrix is a numeric representation of an area, within the original image, to which the feature will be transferred/transposed. Block 2904 may be similar to block 410 of FIG. 4A, for example.

At block 2906, the feature matrix is normalized relative to a portion of the feature matrix that does not represent the depicted feature. Block 2906 may include block 412 of FIG. 4A, for example.

At block 2908, a synthetic image is generated based on the surrogate area matrix and the normalized feature matrix. Block 2908 may include blocks 414, 416, 418, 420, 422, and 424 of FIG. 4A, for example.

It is understood that the blocks of the method 2900 need not occur strictly in the order shown. For example, blocks 2906 and 2908 may occur in parallel, block 2904 may occur before block 2902, and so on.

Figure 30:
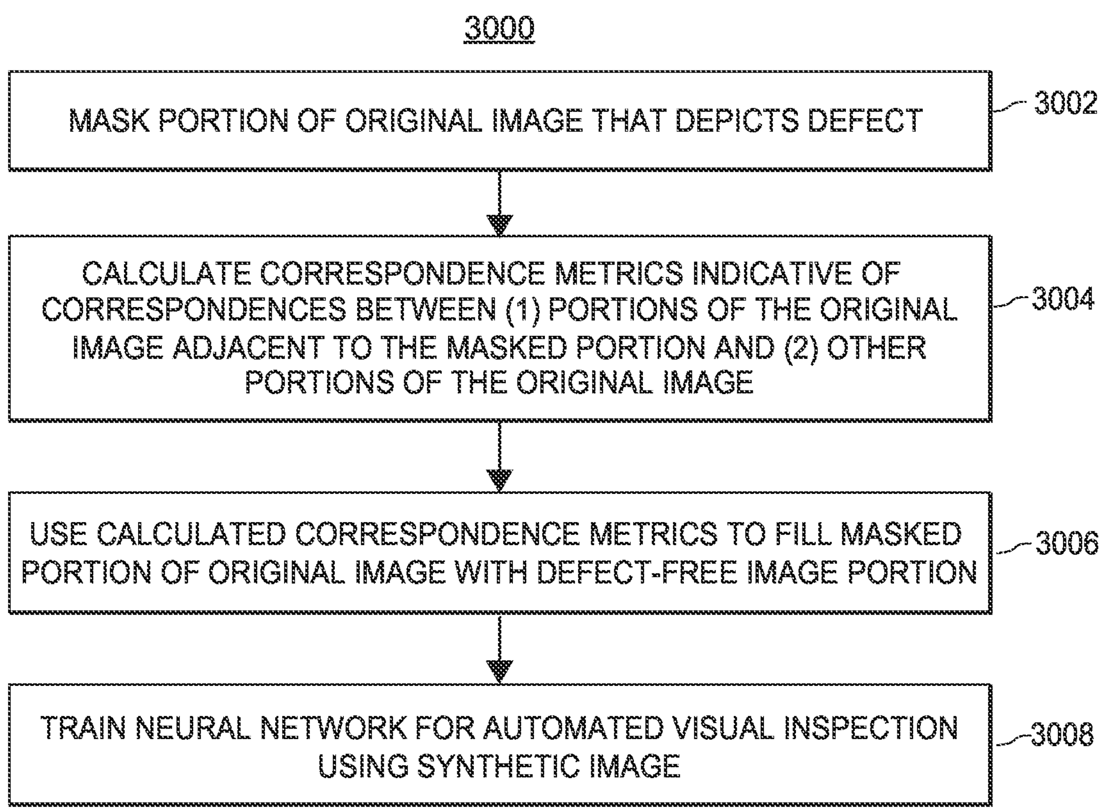
FIG. 30 is a flow diagram of an example method for generating a synthetic image by removing a defect depicted in an original image.

Referring next to FIG. 30, a method 3000 for generating a synthetic image, by removing a defect depicted in an original image, may be executed by module 124 of FIG. 1 (e.g., when processing unit 110 executes instructions of module 124 stored in memory unit 114), for example.

At block 3002, a portion of the original image that depicts the defect is masked. The mask may be applied automatically (e.g., by first using object detection to detect the defect), or may be applied in response to a user input identifying the appropriate mask area, for example.

At block 3004, correspondence metrics are calculated. The metrics reflect pixel statistics that are indicative of correspondences between portions of the original image that are adjacent to the masked portion, and other portions of the original image.

At block 3006, the correspondence metrics calculated at block 3004 are used to fill the masked portion of the original image with a defect-free image portion. For example, the masked portion may be filled/inpainted in a manner that seeks to mimic other patterns within the original image.

At block 3008, a neural network is trained for automated visual inspection using the synthetic image (e.g., with a plurality of other real and synthetic images). The AVI neural network may be an image classification neural network, for example, or an object detection (e.g., convolutional) neural network, etc.

It is understood that the blocks of the method 3000 need not occur strictly in the order shown.

Figure 31:
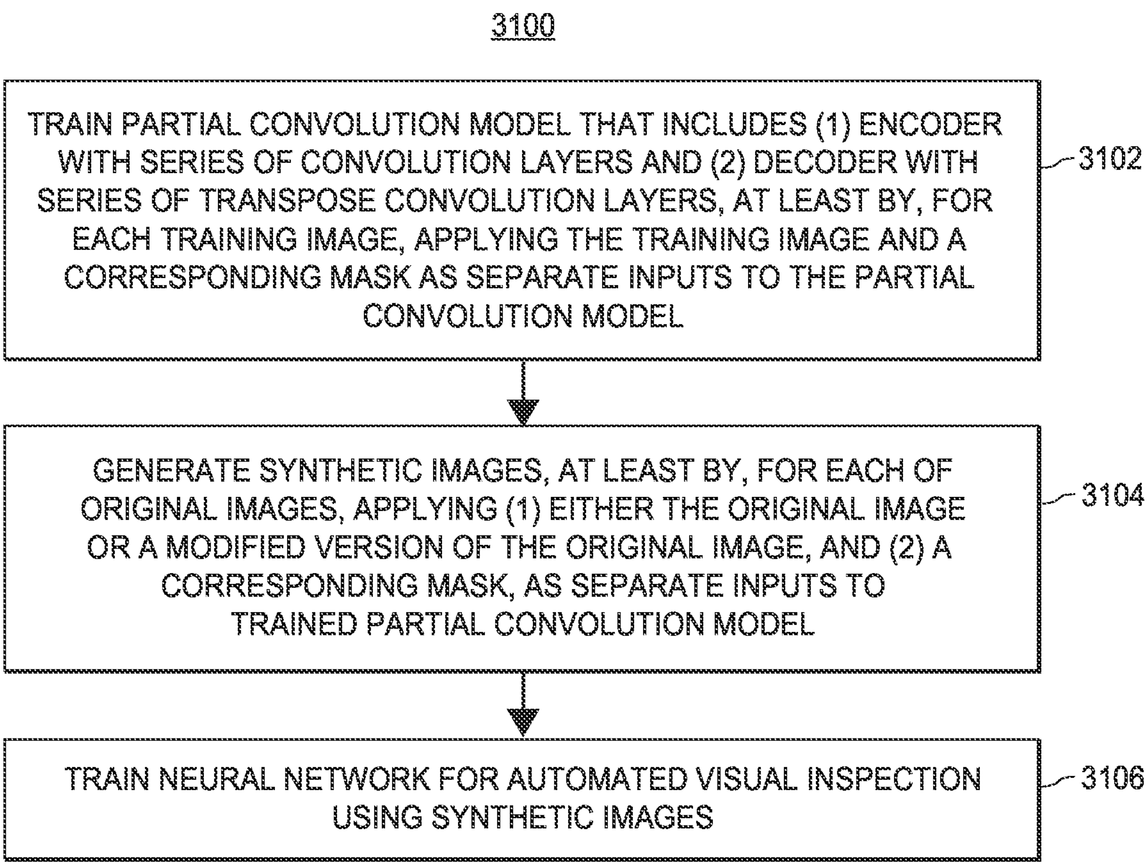
FIG. 31 is a flow diagram of an example method for generating synthetic images by removing or modifying features depicted in original images, or by adding depicted features to the original images.

Referring next to FIG. 31, a method 3100 for generating synthetic images by removing or modifying features depicted in original images, or by adding depicted features to the original images, may be executed by module 124 of FIG. 1 (e.g., when processing unit 110 executes instructions of module 124 stored in memory unit 114), for example.

At block 3102, a partial convolution model (e.g., similar to model 1200) is trained. The partial convolution model includes an encoder with a series of convolution layers, and a decoder with a series of transpose convolution layers. Block 3102 includes, for each image of a set of training images, applying the training image and a corresponding mask as separate inputs to the partial convolution model.

At block 3104, synthetic images are generated. Block 3104 includes, for each of the original images, applying the original image (or a modified version of the original image) and a corresponding mask as separate inputs to the trained partial convolution model. The original image may first be modified by superimposing a cropped image of the feature (e.g., defect) to be added, for example, prior to applying the modified original image and corresponding mask as inputs to the trained partial convolution model.

At block 3106, a neural network for automated visual inspection is trained using the synthetic images (and possibly also using the original images). The AVI neural network may be an image classification neural network, for example, or an object detection (e.g., convolutional) neural network, etc.

It is understood that the blocks of the method 3100 need not occur strictly in the order shown.

Figure 32:
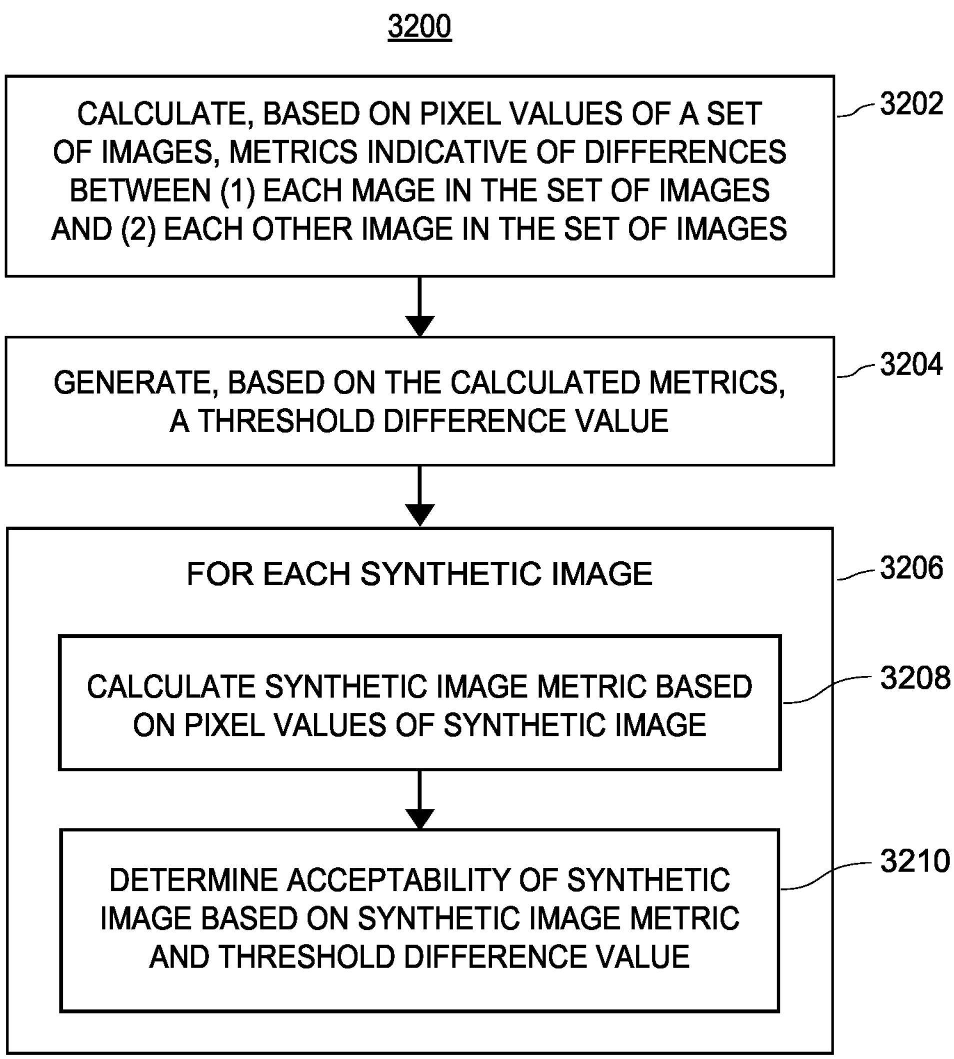
FIG. 32 is a flow diagram of an example method for assessing synthetic images for use in a training image library.

Referring next to FIG. 32, a method 3200 for assessing synthetic images for potential use in a training image library may be executed by module 124 of FIG. 1 (e.g., when processing unit 110 executes instructions of module 124 stored in memory unit 114), for example.

At block 3202, metrics indicative of differences between (1) each image in a set of images (e.g., real images) and (2) each other image in the set of images are calculated based on pixel values of the images. Block 3202 may be similar to block 2702 of FIG. 27, for example.

At block 3204, a threshold difference value (e.g., the "upper bound" of FIG. 27) is generated based on the metrics calculated at block 3202. Block 3204 may be similar to block 2704 of FIG. 27, for example.

At block 3206, various operations are repeated for each of the synthetic images. In particular, at block 3208, a synthetic image metric is calculated based on pixel values of the synthetic image, and at block 3210 acceptability of the synthetic image is determined based on the synthetic image metric and the threshold difference value. Block 3208 may be similar to block 2706 of FIG. 27, and block 3210 may include block 2708 and either block 2710 or block 2712 of FIG. 27, for example. In some implementations, block 3206 includes one or manual steps (e.g., manually determining acceptability based on a displayed histogram similar to the histogram 2800 shown in FIG. 28).

It is understood that the blocks of the method 3200 need not occur strictly in the order shown.

Although the systems, methods, devices, and components thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent that would still fall within the scope of the claims defining the invention.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of generating a synthetic image by transferring a feature onto an original image, the method comprising:

receiving or generating a feature matrix that is a numeric representation of a feature image depicting the feature, with each element of the feature matrix corresponding to a different pixel of the feature image;

receiving or generating a surrogate area matrix that is a numeric representation of an area, within the original image, to which the feature will be transferred, with each element of the surrogate area matrix corresponding to a different pixel of the original image;

normalizing the feature matrix relative to a portion of the feature matrix that does not represent the feature; and generating the synthetic image based on (i) the surrogate area matrix and (ii) the normalized feature matrix.

2. The method of claim 1, wherein:
the original image is an image of a container; and
the feature is a defect associated with the container or contents of the container.

3. The method of claim 2, wherein:
(i) the container is a syringe, and the feature is a defect associated with a barrel of the syringe, a plunger of the syringe, a needle shield of the syringe, or a fluid within the syringe; or
(ii) the container is a vial, and the feature is a defect associated with a wall of the vial, a cap of the vial, a crimp of the vial, or a fluid or lyophilized cake within the vial.

4. The method of claim 1, wherein normalizing the feature matrix includes normalizing the feature matrix on a per-row or per-column basis.

5. The method of claim 4, wherein normalizing the feature matrix on a per-row or per-column basis includes, for each row or column of the feature matrix:
generating a feature row histogram of element values for the row or column of the feature matrix.

6. The method of claim 5, wherein normalizing the feature matrix on a per-row or per-column basis further includes, for each row or column of the feature matrix:
identifying a peak portion of the feature row histogram that corresponds to a portion of the row or column of the feature matrix that does not represent the feature; and
for each element of the row or column of the feature matrix, subtracting a center value of the peak portion from a value of the element.

7. The method of claim 6, wherein subtracting the center value of the peak portion from the value of the element includes subtracting (i) an average value of all values in the row or column that correspond to the peak portion from (ii) the value of the element.

8. The method of claim 1, further comprising:
for each row or column of the surrogate area matrix,
generating a surrogate area row histogram,
identifying a peak portion of the surrogate area row histogram, and
determining a number range representative of a width of the peak portion of the surrogate area row histogram,
wherein generating the synthetic image includes generating the synthetic image based on (i) the number range for each row or column of the feature matrix, and (ii) the normalized feature matrix.

9. The method of claim 8, wherein generating the synthetic image includes, for each row or column of the feature matrix:
for each element of the row or column of the feature matrix, determining whether the element of the feature matrix has a value within the number range; and
modifying an original image matrix that is a numeric representation of the original image by either (i) when the element of the feature matrix has a value within the number range, retaining an original value of a corresponding element in the original image matrix, or (ii) when the value of the element of the feature matrix is not within the number range, setting the corresponding element in the original image matrix equal to a sum of the original value and the value of the element in the feature matrix.

10. The method of claim 9, wherein generating the synthetic image includes converting the modified original image matrix to a bitmap image.

11. The method of claim 1, wherein receiving or generating the feature matrix includes rotating the feature matrix or the feature image, and wherein rotating the feature matrix or the feature image includes rotating the feature matrix or the feature image by an amount that is based on (i) a rotation of the feature depicted in the feature image and (ii) a desired rotation of the feature depicted in the feature image.

12. The method of claim 11, further comprising:
determining the desired rotation based on a position of the area to which the feature will be transferred.

13. The method of claim 1, further comprising:
repeating the method for each of a plurality of features corresponding to different features in a feature library.

14. The method of claim 1, further comprising:
generating a plurality of synthetic images by repeating the method for each of a plurality of original images.

15. The method of claim 14, further comprising:
training a neural network for automated visual inspection using the plurality of synthetic images and the plurality of original images.

16. A system comprising:
one or more processors; and
one or more non-transitory, computer-readable media storing instructions that, when executed by the one or more processors, cause the system to
receive or generate a feature matrix that is a numeric representation of a feature image depicting a feature, with each element of the feature matrix corresponding to a different pixel of the feature image,
receive or generate a surrogate area matrix that is a numeric representation of an area, within an original image, to which the feature will be transferred, with each element of the surrogate area matrix corresponding to a different pixel of the original image,
normalize the feature matrix relative to a portion of the feature matrix that does not represent the feature, and
generate a synthetic image based on (i) the surrogate area matrix and (ii) the normalized feature matrix.

17. The system of claim 16, wherein normalizing the feature matrix includes normalizing the feature matrix on a per-row or per-column basis.

18. The system of claim 17, wherein normalizing the feature matrix on a per-row or per-column basis includes, for each row or column of the feature matrix:
generating a feature row histogram of element values for the row or column of the feature matrix.

19. The system of claim 18, wherein normalizing the feature matrix on a per-row or per-column basis further includes, for each row or column of the feature matrix:
identifying a peak portion of the feature row histogram that corresponds to a portion of the row or column of the feature matrix that does not represent the feature; and
for each element of the row or column of the feature matrix, subtracting a center value of the peak portion from a value of the element.

20. The system of claim 19, wherein subtracting the center value of the peak portion from the value of the element includes subtracting (i) an average value of all values in the row or column that correspond to the peak portion from (ii) the value of the element.

21. The system of claim 16, wherein the instructions further cause the system to:
for each row or column of the surrogate area matrix,
generate a surrogate area row histogram,
identify a peak portion of the surrogate area row histogram, and determine a number range representative of a width of the peak portion of the surrogate area row histogram, wherein generating the synthetic image includes generating the synthetic image based on (i) the number range for each row or column of the feature matrix, and (ii) the normalized feature matrix.

22. The system of claim 21, wherein generating the synthetic image includes:

for each row or column of the feature matrix, for each element of the row or column of the feature matrix, determining whether the element of the feature matrix has a value within the number range, and modifying an original image matrix that is a numeric representation of the original image by either (i) when the element of the feature matrix has a value within the number range, retaining an original value of a corresponding element in the original image matrix, or (ii) when the value of the element of the feature matrix is not within the number range, setting the corresponding element in the original image matrix equal to a sum of the original value and the value of the element in the feature matrix; and converting the modified original image matrix to a bitmap image.

23. The system of claim 16, wherein receiving or generating the feature matrix includes rotating the feature matrix or the feature image, and wherein rotating the feature matrix or the feature image includes rotating the feature matrix or the feature image by an amount that is based on (i) a rotation of the feature depicted in the feature image and (ii) a desired rotation of the feature depicted in the feature image.

24. The system of claim 23, wherein the instructions further cause the system to:

determine the desired rotation based on a position of the area to which the feature will be transferred.

* * * * *